(12) United States Patent
Kobayashi et al.

(10) Patent No.: US 10,547,821 B2
(45) Date of Patent: Jan. 28, 2020

(54) REPRODUCTION APPARATUS AND INFORMATION PROCESSING METHOD

(71) Applicant: SONY CORPORATION, Tokyo (JP)

(72) Inventors: Yoshiyuki Kobayashi, Tokyo (JP); Kouichi Uchimura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 168 days.

(21) Appl. No.: 15/542,349

(22) PCT Filed: Jan. 8, 2016

(86) PCT No.: PCT/JP2016/050449
§ 371 (c)(1),
(2) Date: Jul. 7, 2017

(87) PCT Pub. No.: WO2016/117383
PCT Pub. Date: Jul. 28, 2016

(65) Prior Publication Data
US 2018/0278907 A1  Sep. 27, 2018

(30) Foreign Application Priority Data

Jan. 23, 2015 (JP) .................................. 2015-011178

(51) Int. Cl.
*H04N 9/87* (2006.01)
*G11B 20/10* (2006.01)
(Continued)

(52) U.S. Cl.
CPC ..... *H04N 9/8715* (2013.01); *G11B 20/00007* (2013.01); *G11B 20/10* (2013.01);
(Continued)

(58) Field of Classification Search
CPC ...... H04N 9/8715; H04N 5/76; H04N 5/7605; H04N 7/0117; H04N 9/64; H04N 9/8205;
(Continued)

(56) References Cited

U.S. PATENT DOCUMENTS

2011/0116770 A1* 5/2011 Kobayashi ........... G11B 27/329
386/341
2013/0342645 A1  12/2013 Kobayashi
(Continued)

FOREIGN PATENT DOCUMENTS

BR     112013031870 A2   12/2016
CN        101496090 A      7/2009
(Continued)

OTHER PUBLICATIONS

International Search Report and Written Opinion of PCT Application No. PCT/JP2016/050449, dated Feb. 9, 2016, 2 pages of English Translation and 7 pages of ISRWO.
(Continued)

*Primary Examiner* — Loi H Tran
(74) *Attorney, Agent, or Firm* — Chip Law Group

(57) ABSTRACT

Provided is a reproduction apparatus and an information processing method which enable graphics to be superimposed on a video to be converted appropriately. In a format of contents to be reproduced by a reproduction apparatus according to an aspect of the present technology, each of a configuration of a video plane which is a storage area of data before a video that constitutes an output image is synthesized and a configuration of a graphics plane which is a storage area of data before a graphics that constitutes the output image is synthesized is represented by attributes of a resolution, a color gamut, a color depth, and a dynamic range conversion function. Moreover, a plurality of combinations of attributes representing the configuration of the video plane and attributes representing the configuration of the graphics plane are determined in advance.

6 Claims, 19 Drawing Sheets

(51) Int. Cl.
  *H04N 5/76* (2006.01)
  *H04N 21/4402* (2011.01)
  *G11B 27/32* (2006.01)
  *H04N 9/82* (2006.01)
  *H04N 21/485* (2011.01)
  *G11B 20/00* (2006.01)
  *H04N 7/01* (2006.01)
  *H04N 9/64* (2006.01)
  *H04N 5/85* (2006.01)
  *H04N 19/85* (2014.01)

(52) U.S. Cl.
  CPC .............. *G11B 27/32* (2013.01); *H04N 5/76* (2013.01); *H04N 5/7605* (2013.01); *H04N 7/0117* (2013.01); *H04N 9/64* (2013.01); *H04N 9/8205* (2013.01); *H04N 9/8227* (2013.01); *H04N 21/4402* (2013.01); *H04N 21/4854* (2013.01); *G11B 2020/00072* (2013.01); *H04N 5/85* (2013.01); *H04N 19/85* (2014.11)

(58) Field of Classification Search
  CPC ............. H04N 9/8227; H04N 21/4402; H04N 21/4854; H04N 19/85; H04N 5/85; G11B 20/00007; G11B 20/10; G11B 27/32; G11B 2020/00072
  USPC ......................................................... 386/240
  See application file for complete search history.

(56) References Cited

U.S. PATENT DOCUMENTS

| | | | |
|---|---|---|---|
| 2013/0343723 | A1 | 12/2013 | Kobayashi |
| 2013/0343724 | A1 | 12/2013 | Kobayashi |
| 2014/0003793 | A1 | 1/2014 | Kobayashi |
| 2014/0125696 | A1 | 5/2014 | Newton et al. |
| 2016/0373712 | A1* | 12/2016 | Yamamoto ............. G11B 20/10 |
| 2017/0244947 | A1 | 8/2017 | Uchimura et al. |

FOREIGN PATENT DOCUMENTS

| | | |
|---|---|---|
| CN | 101772961 A | 7/2010 |
| CN | 101859580 A | 10/2010 |
| CN | 102301727 A | 12/2011 |
| CN | 103597812 A | 2/2014 |
| CN | 103873847 A | 6/2014 |
| CN | 103903639 A | 7/2014 |
| CN | 103905811 A | 7/2014 |
| CN | 103945212 A | 7/2014 |
| EP | 2276268 A1 | 1/2011 |
| EP | 2721811 A1 | 4/2014 |
| EP | 3211886 A1 | 8/2017 |
| HK | 1164002 A1 | 10/2015 |
| JP | 2010-259053 A | 11/2010 |
| JP | 2010-268332 A | 11/2010 |
| JP | 4915457 B2 | 4/2012 |
| JP | 2012-142951 A | 7/2012 |
| JP | 6053767 B2 | 12/2016 |
| JP | 6279694 B2 | 2/2018 |
| MX | 340266 B | 7/2016 |
| RU | 2014100893 A | 7/2015 |
| TW | 201517027 A | 5/2015 |
| TW | 201637004 A | 10/2016 |
| WO | 2010/113729 A1 | 10/2010 |
| WO | 2012/172460 A1 | 12/2012 |
| WO | 2015/005189 A1 | 1/2015 |
| WO | 2015/198880 A1 | 12/2015 |
| WO | 2016/063746 A1 | 4/2016 |

OTHER PUBLICATIONS

Extended European Search Report of EP Patent Application No. 16739990.6, dated Jul. 26, 2018, 06 pages.

Office Action for CN Patent Application No. 201680006038.7, dated Jul. 15, 2019, 9 pages of Office Action and 9 pages of English Translation.

* cited by examiner

*FIG. 5* graphics plane CONFIGURATION
- RESOLUTION
- COLOR GAMUT
- COLOR DEPTH
- DYNAMIC RANGE video plane CONFIGURATION
- RESOLUTION
- COLOR GAMUT
- COLOR DEPTH
- DYNAMIC RANGE background plane CONFIGURATION
- RESOLUTION
- COLOR GAMUT
- COLOR DEPTH
- DYNAMIC RANGE

FIG. 7

| video plane RESOLUTION | graphics plane RESOLUTION | background plane RESOLUTION |
|---|---|---|
| 1920 × 1080 | 1920 × 1080 | 1920 × 1080 |
| 3840 × 2160 | 1920 × 1080  *1 | 1920 × 1080  *1 |

FIG. 8

| NO. | ATTRIBUTE | video plane | graphics plane | background plane |
|---|---|---|---|---|
| 1 | RESOLUTION | 1920×1080 | 1920×1080 | 1920×1080 |
|   | COLOR GAMUT | BT.709 | BT.709 | BT.709 |
|   | COLOR DEPTH | 8 | 8 | 8 |
|   | DYNAMIC RANGE | BT.1886 | BT.1886 | BT.1886 |
| 2 | RESOLUTION | 1920×1080 | 1920×1080 | 1920×1080 |
|   | COLOR GAMUT | BT.709 | BT.709 | BT.709 |
|   | COLOR DEPTH | 10 | 10 | 10 |
|   | DYNAMIC RANGE | BT.1886 | BT.1886 | BT.1886 |
| 3 | RESOLUTION | 1920×1080 | 1920×1080 | 1920×1080 |
|   | COLOR GAMUT | BT.2020 | BT.2020 | BT.2020 |
|   | COLOR DEPTH | 10 | 10 | 10 |
|   | DYNAMIC RANGE | BT.1886 | BT.1886 | BT.1886 |
| 4 | RESOLUTION | 3840×2160 | 1920×1080 *1 | 1920×1080 *1 |
|   | COLOR GAMUT | BT.709 | BT.709 | BT.709 |
|   | COLOR DEPTH | 10 | 10 | 10 |
|   | DYNAMIC RANGE | BT.1886 | BT.1886 | BT.1886 |
| 5 | RESOLUTION | 3840×2160 | 1920×1080 *1 | 1920×1080 *1 |
|   | COLOR GAMUT | BT.2020 | BT.2020 | BT.2020 |
|   | COLOR DEPTH | 10 | 10 | 10 |
|   | DYNAMIC RANGE | BT.1886 | BT.1886 | BT.1886 |
| 6 *2 | RESOLUTION | 1920×1080 | 1920×1080 | 1920×1080 |
|   | COLOR GAMUT | BT.2020 | BT.2020 | BT.2020 |
|   | COLOR DEPTH | 10 | 10 | 10 |
|   | DYNAMIC RANGE | SMPTE ST.2084 | BT.1886 | BT.1886 |
| 7 *2 | RESOLUTION | 3840×2160 | 1920×1080 *1 | 1920×1080 *1 |
|   | COLOR GAMUT | BT.2020 | BT.2020 | BT.2020 |
|   | COLOR DEPTH | 10 | 10 | 10 |
|   | DYNAMIC RANGE | SMPTE ST.2084 | BT.1886 | BT.1886 |
| 8 *3 | RESOLUTION | 1920×1080 | 1920×1080 | 1920×1080 |
|   | COLOR GAMUT | BT.2020 | BT.2020 | BT.2020 |
|   | COLOR DEPTH | 10 | 10 | 10 |
|   | DYNAMIC RANGE | SMPTE ST.2084 | SMPTE ST.2084 | SMPTE ST.2084 |

FIG. 9

| NO. | ATTRIBUTE | video plane | graphics plane | background plane |
|---|---|---|---|---|
| 9 *3 | RESOLUTION | 3840 × 2160 | 1920 × 1080  *1 | 1920 × 1080  *1 |
|  | COLOR GAMUT | BT. 2020 | BT. 2020 | BT. 2020 |
|  | COLOR DEPTH | 10 | 10 | 10 |
|  | DYNAMIC RANGE | SMPTE ST. 2084 | SMPTE ST. 2084 | SMPTE ST. 2084 |
| 10 *3 | RESOLUTION | 1920 × 1080 | 1920 × 1080 | 1920 × 1080 |
|  | COLOR GAMUT | BT. 2020 | BT. 2020 | BT. 2020 |
|  | COLOR DEPTH | 10 | 10 | 10 |
|  | DYNAMIC RANGE | PRIVATE 1 | PRIVATE 1 | PRIVATE 1 |
| 11 *2 | RESOLUTION | 1920 × 1080 | 1920 × 1080 | 1920 × 1080 |
|  | COLOR GAMUT | BT. 2020 | BT. 2020 | BT. 2020 |
|  | COLOR DEPTH | 10 | 10 | 10 |
|  | DYNAMIC RANGE | PRIVATE 1 | BT. 1886 | BT. 1886 |
| 12 *3 | RESOLUTION | 3840 × 2160 | 1920 × 1080  *1 | 1920 × 1080  *1 |
|  | COLOR GAMUT | BT. 2020 | BT. 2020 | BT. 2020 |
|  | COLOR DEPTH | 10 | 10 | 10 |
|  | DYNAMIC RANGE | PRIVATE 1 | PRIVATE 1 | PRIVATE 1 |
| 13 *2 | RESOLUTION | 3840 × 2160 | 1920 × 1080  *1 | 1920 × 1080  *1 |
|  | COLOR GAMUT | BT. 2020 | BT. 2020 | BT. 2020 |
|  | COLOR DEPTH | 10 | 10 | 10 |
|  | DYNAMIC RANGE | PRIVATE 1 | BT. 1886 | BT. 1886 |
| 14 *3 | RESOLUTION | 1920 × 1080 | 1920 × 1080 | 1920 × 1080 |
|  | COLOR GAMUT | BT. 2020 | BT. 2020 | BT. 2020 |
|  | COLOR DEPTH | 12 | 12 | 12 |
|  | DYNAMIC RANGE | PRIVATE 2 | PRIVATE 2 | PRIVATE 2 |
| 15 *2 | RESOLUTION | 1920 × 1080 | 1920 × 1080 | 1920 × 1080 |
|  | COLOR GAMUT | BT. 2020 | BT. 2020 | BT. 2020 |
|  | COLOR DEPTH | 12 | 12 | 12 |
|  | DYNAMIC RANGE | PRIVATE 2 | BT. 1886 | BT. 1886 |
| 16 *3 | RESOLUTION | 3840 × 2160 | 1920 × 1080  *1 | 1920 × 1080  *1 |
|  | COLOR GAMUT | BT. 2020 | BT. 2020 | BT. 2020 |
|  | COLOR DEPTH | 12 | 12 | 12 |
|  | DYNAMIC RANGE | PRIVATE 2 | PRIVATE 2 | PRIVATE 2 |
| 17 *2 | RESOLUTION | 3840 × 2160 | 1920 × 1080  *1 | 1920 × 1080  *1 |
|  | COLOR GAMUT | BT. 2020 | BT. 2020 | BT. 2020 |
|  | COLOR DEPTH | 12 | 12 | 12 |
|  | DYNAMIC RANGE | PRIVATE 2 | BT. 1886 | BT. 1886 |

REPRODUCTION APPARATUS AND INFORMATION PROCESSING METHOD

CROSS REFERENCE TO RELATED APPLICATIONS

This application is a U.S. National Phase of International Patent Application No. PCT/JP2016/050449 filed on Jan. 8, 2016, which claims priority benefit of Japanese Patent Application No. JP 2015-011178 filed in the Japan Patent Office on Jan. 23, 2015. Each of the above-referenced applications is hereby incorporated herein by reference in its entirety.

TECHNICAL FIELD

The present technology relates to a reproduction apparatus, an information processing method, and a program, and more particularly, to a reproduction apparatus, an information processing method, and a program which enable graphics to be superimposed on a video to be converted appropriately.

BACKGROUND ART

A Blu-ray (registered trademark) disc (hereinafter referred appropriately to as BD) is known as one of recording media for contents such as a movie. Authoring of a video recorded on a BD is performed by compressing a dynamic range of a master video assuming that the video is played by a display having a standard luminance (a maximum luminance of 100 nit (=100 cd/m2)).

A master video is captured by a high-quality camera and has a dynamic range which is equal to or higher than a dynamic range displayable by a standard-luminance display. The dynamic range of the compressed master video is naturally sacrificed.

With development of the technology of a display such as an organic electroluminescence (EL) display or a liquid crystal display (LCD), a display which is brighter than a standard display and has a maximum luminance of 500 nit or 1000 nit has been commercialized, and there is a demand for contents which take advantage of the performance of such a display.

Therefore, in recent years, the Blu-ray Disc Association (BDA) which is the group of companies who formulates BD specifications has discussed specifications for recording a high dynamic range (HDR) video which is a video of which the dynamic range is extended.

CITATION LIST

Patent Document

Patent Document 1: Japanese Patent Application Laid-Open No. 2012-142951

SUMMARY OF THE INVENTION

Problems to be Solved by the Invention

The BD specifications (Blu-ray Disc Read-Only Format Part 3: Audio Visual Basic Specifications) enable a high-interactive function to be provided using BD-Java (BD-J (registered trademark)). The BD-J graphics is synthesized by being superimposed on the video of a main part and are presented to users.

As for the BD-J graphics, it is defined as specifications that the resolution is up to full HD (1920×1080), the color gamut is sRGB, the color depth is 8 bits for each color of RGB and is 24 bits in total, and an alpha channel is additionally usable. However, it depends on implementation how the graphics is synthesized with a video.

When it is possible to use a HDR video and the video has high quality in terms of a resolution, a color gamut, a dynamic range, and the like, a BD player needs to convert the BD-J graphics appropriately in order to synthesize the BD-J graphics without causing a color blur.

The present technology has been made in view of the above-described problems and enables the graphics to be superimposed on a video to be converted appropriately.

Solutions to Problems

A reproduction apparatus of the present technology includes: a setting unit that sets a predetermined combination from a plurality of combinations of attributes representing a configuration of a video plane which is a storage area of data before a video that constitutes an output image is synthesized and attributes representing a configuration of a graphics plane which is a storage area of data before a graphics that constitutes the output image is synthesized, each of the configuration of the video plane and the configuration of the graphics plane being represented by attributes of a resolution, a color gamut, a color depth, and a dynamic range conversion function; a decoding unit that decodes a video stream; a first generation unit that generates data of a video corresponding to an attribute representing the configuration of the video plane that constitutes the predetermined combination set by the setting unit on the basis of data obtained by decoding the video stream and stores the generated data in the video plane; an execution unit that executes an application that controls display of the graphics; a second generation unit that generates data of a graphics corresponding to an attribute representing the configuration of the graphics plane that constitutes the predetermined combination set by the setting unit on the basis of source data obtained by execution of the application and stores the generated data in the graphics plane; a synthesis unit that synthesizes the data of the video stored in the video plane and the data of the graphics stored in the graphics plane; and an output unit that outputs data of the output image obtained by the synthesis of the synthesis unit.

The second generation unit may convert a color gamut of the source data, perform at least one of processes of resolution conversion and dynamic range conversion using the dynamic range conversion function on the data obtained by converting the color gamut to generate data, and store the generated data in the graphics plane.

The setting unit may further set an attribute of a synthesis storage area to be used for synthesis of the video data stored in the video plane and the graphics data stored in the graphics plane.

The setting unit may set a predetermined resolution as an attribute of the synthesis storage area and set a combination in which the same resolution as the predetermined resolution is included in an attribute as the predetermined combination.

The reproduction apparatus may further include a storage unit that stores performance information representing a performance of a monitor that outputs the output image; and a conversion unit that converts the output image obtained by the synthesis of the synthesis unit to an image which can be output by the performance represented by the performance information. In this case, the output unit may output data of the output image after conversion of the conversion unit.

The reproduction apparatus may further include a reading unit that reads the video stream and the data of the application from a recording medium mounted on the reproduction apparatus.

The recording medium may be a Blu-ray Disc, and the application may be a BD-J application.

Effects of the Invention

According to the present technology, it is possible to convert the graphics superimposed on a video appropriately.

It should be noted that the effects described herein are not necessarily limited and anyone of the effects described in the present technology may be produced.

BRIEF DESCRIPTION OF DRAWINGS

FIG. 5 is a diagram illustrating an example of an attribute representing a configuration of each plane.

FIG. 7 is a diagram illustrating a combination of resolutions of each plane.

FIG. 8 is a diagram illustrating an example of combinations permitted as an attribute of a configuration of each plane.

FIG. 9 is a diagram continuous to FIG. 8.

MODE FOR CARRYING OUT THE INVENTION

Hereinafter, modes for carrying out the present technology will be described. The description will be given in the following order.
1. Reproduction system
2. BD format
3. Configuration of reproduction apparatus 1
4. Operation of reproduction apparatus 1
5. Modification <<1. Reproduction System>>

Figure 1:
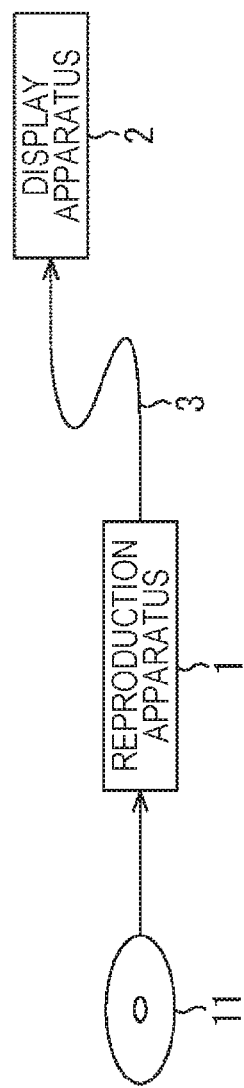
FIG. 1 is a diagram illustrating a configuration example of a reproduction system according to an embodiment of the present technology.

FIG. 1 is a diagram illustrating a configuration example of a reproduction system according to an embodiment of the present technology.

A reproduction system illustrated in FIG. 1 includes a reproduction apparatus 1 and a display apparatus 2. The reproduction apparatus 1 and the display apparatus 2 are connected by a cable 3 of a predetermined specification such as a high definition multimedia interface (HDMI: registered trademark) specification. The reproduction apparatus 1 and the display apparatus 2 may be connected via radio communication.

The reproduction apparatus 1 reproduces contents recorded on a disc 11 mounted on a drive. The disc 11 is an optical disc on which contents are recorded according to a Blu-ray (registered trademark) disc read-only (BD-ROM) format, for example.

The contents may be recorded on the disc 11 according to other BD formats such as BD-R or BD-RE. Moreover, contents may be provided to the reproduction apparatus 1 using a removable medium other than an optical disc, such as a memory card having a flash memory mounted thereon.

A video having a so-called 4K resolution such as 3840×2160 pixels or a video having a so-called full HD resolution such as 1920×1080 is recorded on the disc 11. Although a 4K resolution is described as 3840×2160 pixels, other resolutions such as 4096×2160 pixels may be used.

A color gamut of the video recorded on the disc 11 is BT.709 or BT.2020, for example. BT.709 and BT.2020 are standard specifications. BT.2020 is a wider color gamut than BT.709.

Moreover, the video recorded on the disc 11 is a standard dynamic range (SDR) video or a high dynamic range (HDR) video having a wider dynamic range than the SDR video.

The SDR video is a video having a dynamic range (luminance range) which can be displayed by a monitor having a standard luminance. The maximum luminance of the standard luminance monitor is 100 nit (=100 cd/m2), for example. For example, a SDR video is generated by compressing a dynamic range of a master video.

On the other hand, a HDR video is a video having a wider dynamic range than the SDR video. The maximum luminance of the HDR video is several thousands of nit, for example, and is higher than the standard luminance. The HDR video is generated by adjusting the dynamic range of a master video using an opto-electrical transfer function (OETF) of a predetermined specification so that the HDR video has a wider dynamic range than the SDR video.

OETF is a conversion function used for compressing the grayscale level of the dynamic range. A conversion function used for converting an electrical signal to brightness during reproduction of the HDR video is an electro-optical transfer function (EOTF). One of the specifications of these conversion functions is the Society of Motion Picture and Television Engineers (SMPTE) ST.2084 specification, for example.

The OETF/EOTF of the SMPTE ST.2084 specification is a conversion function for next-generation monitors having a higher luminance and a wider dynamic range than standard monitors. Note that one of specifications for the conversion function dedicated for standard monitors of which the maximum luminance is 100 nit is BT.1886.

In this way, the reproduction apparatus 1 can reproduce a higher-quality video than a video defined by the BD-ROM format part 3 version 2.4 which is the conventional BD format, in terms of a resolution, a color gamut, and a dynamic range.

The reproduction apparatus 1 outputs video data obtained by reproducing contents to the display apparatus 2 and displays the video data on a monitor of the display apparatus 2. The display apparatus 2 has a monitor such as an organic EL display or an LCD.

The reproduction apparatus 1 executes a BD-J application which is an application that controls the display of BD-J graphics appropriately and outputs the GUI such as buttons that form a menu screen so as to be superimposed on the video of the contents being reproduced. A user who watches contents operates buttons displayed on the monitor of the display apparatus 2 to perform various selecting operations.

<<2. Bd Format>>

<2-1. AV Stream Management Structure>

Here, the BD-ROM format will be described.

Figure 2:
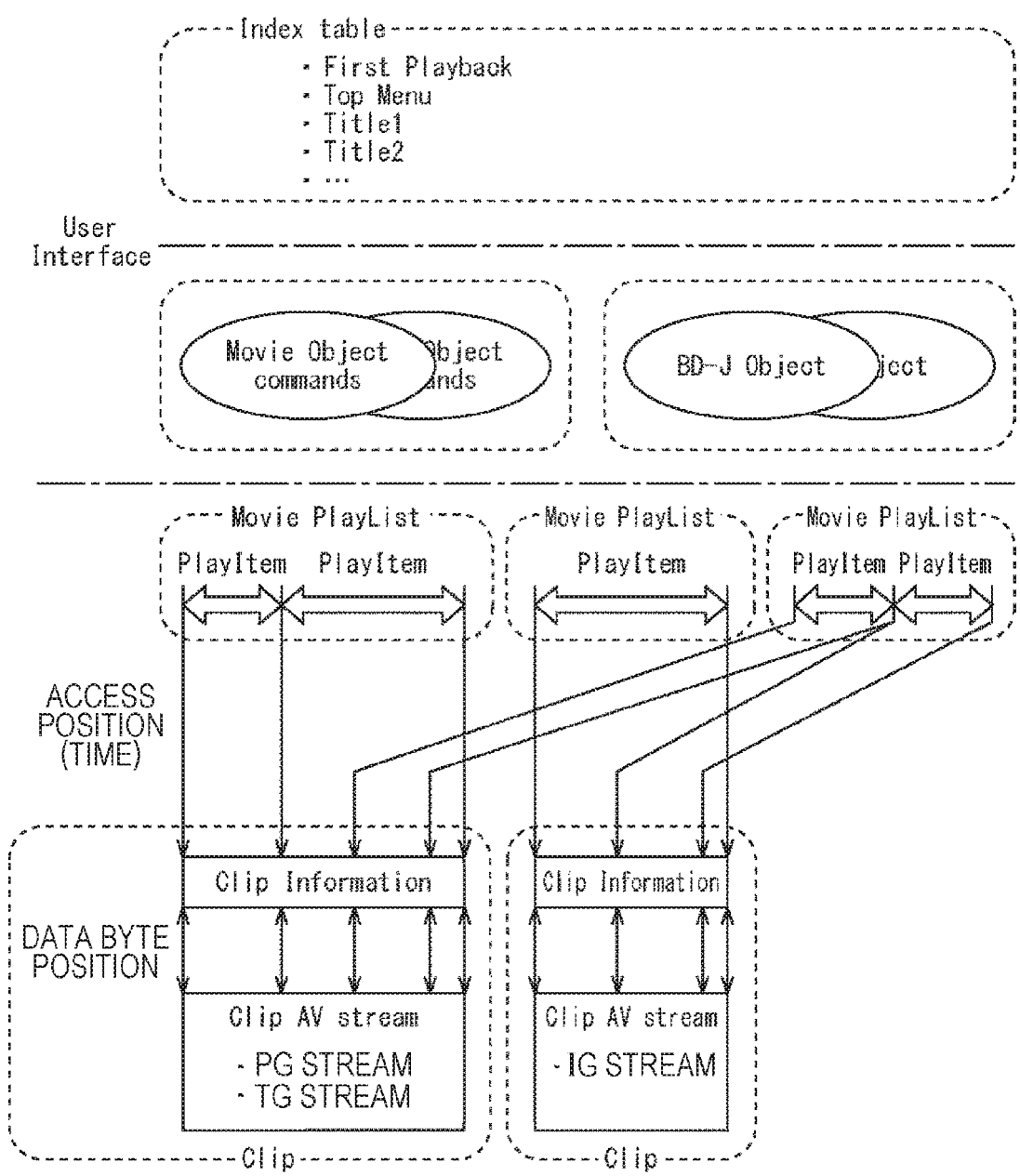
FIG. 2 is a diagram illustrating an example of a management structure of an AV stream of a BD-ROM format.

FIG. 2 is a diagram illustrating a management structure of an AV stream (Clip AV stream) in the BD-ROM format.

AV streams are managed using the layers of PlayLists and Clips. AV streams may be recorded on a local storage of the reproduction apparatus 1 as well as the disc 11.

A pair of one AV stream and Clip Information which is information associated thereto is managed as one object. The pair of the AV stream and the Clip Information is referred to as Clip.

AV streams are deployed on a time axis and an access point of each Clip is designated in a PlayList by a timestamp. The Clip Information is used, for example, for finding out an address from which decoding of an AV stream is to start.

The PlayList is a collection of reproduction segments of AV streams. One reproduction segment of the AV stream is referred to as a PlayItem. A PlayItem is represented by a pair of an IN point and an OUT point of the reproduction segment on the time axis. As illustrated in FIG. 2, a PlayList is made up of one or multiple PlayItems.

The first PlayList from the left side of FIG. 2 is made up of two PlayItems, the front-half part and the latter-half part of an AV stream included in the Clip on the left side are referred to by the two PlayItems.

The second PlayList from the left side is made up of one PlayItem, and the entire AV stream included in the Clip on the right side is referred to by the PlayItem.

The third PlayList from the left side is made up of two PlayItems, and a certain part of an AV stream included in the Clip on the left side and a certain part of an AV stream included in the Clip on the right side are referred to by the two PlayItems.

For example, in a case where the PlayItem on the left side included in the first PlayList from the left side is designated by a disc navigation program as a reproduction target, the front-half part of the AV stream included in the Clip on the left side, which is referred to by the PlayItem, is reproduced.

Note that, in a PlayList, a reproduction path created by a line of one or more PlayItems is referred to as a Main Path. Moreover, in a PlayList, a reproduction path created by one or more SubPlayItems along the Main Path is referred to as a Sub Path.

The AV stream appropriately includes a Presentation Graphics (PG) stream which is the stream of a subtitle and an Interactive Graphics (IG) stream which is the stream of graphics of menus or the like.

A Movie Object and a BD-J Object belong to an object layer which is one layer above the PlayList layer. The Movie Object includes terminal information that links a high definition movie (HDMV) navigation command program (navigation command) and a movie object.

The navigation command is a command for controlling reproduction of PlayLists. The terminal information includes information for permitting interactive operations of users on a BD player. In a BD player, user operations such as menu calls and title searches are controlled on the basis of the terminal information.

The BD-J Object is a BD-J application. When the BD-J application is executed, a more advanced interactive function than the navigation command is provided to users.

An Index table that manages titles stored in BD belongs to a layer which is one layer above the object layer.

<2-2. Directory Structure>

Figure 3:
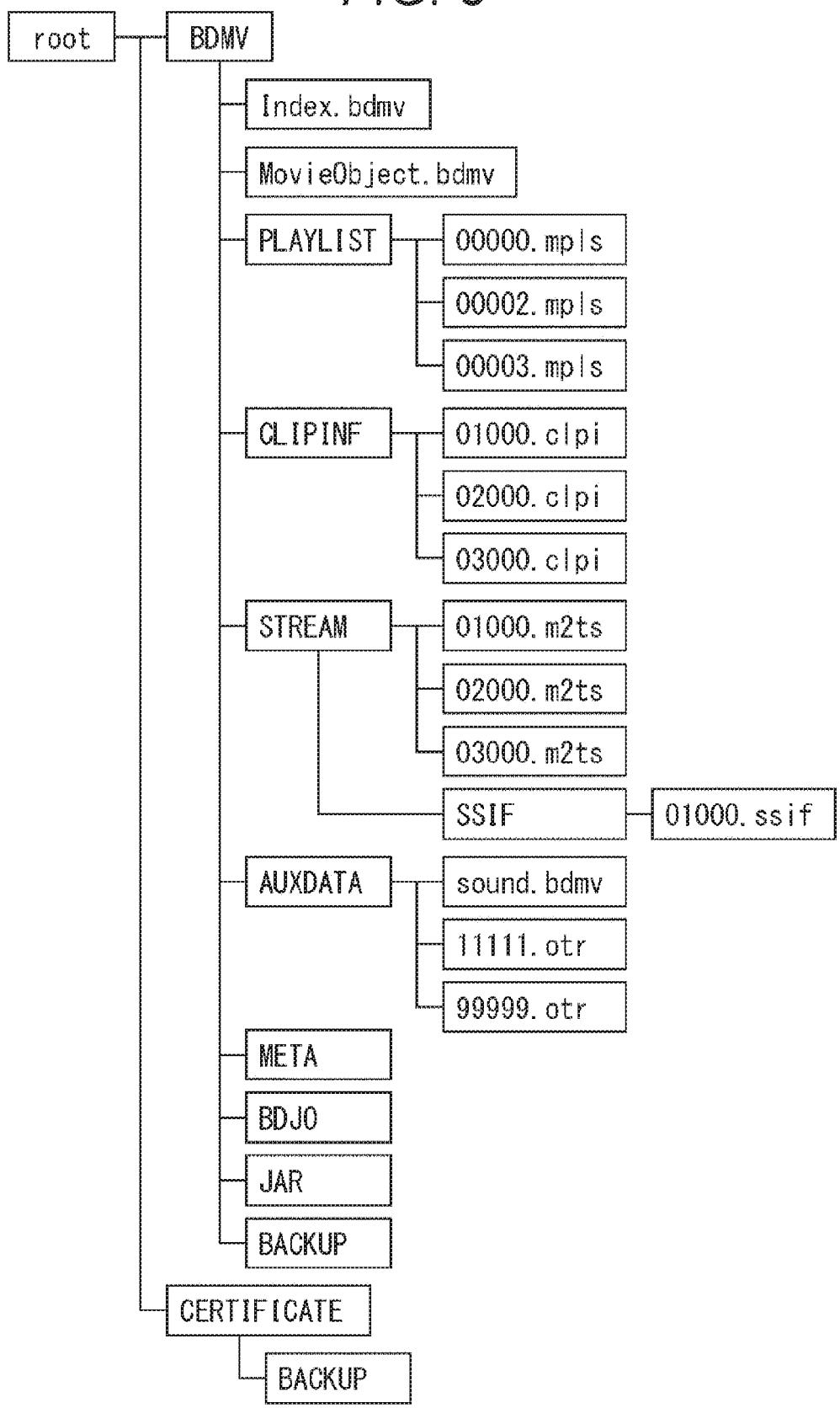
FIG. 3 is a diagram illustrating a directory structure of a file recorded on a disc 11.

FIG. 3 is a diagram illustrating an example of a directory structure of files recorded on the disc 11.

The files recorded on the disc 11 are hierarchically managed by a directory structure. One root directory is created on the disc 11. A BDMV directory is placed under the root directory.

An Index table file which is a file to which the name of "Index.bdmv" is set and a MovieObjec file which is a file to which the name of "MovieObject.bdmv" is set are stored under the BDMV directory. An Index table is described in the Index table file.

A PLAYLIST directory, a CLIPINF directory, a STREAM directory, and the like are provided under the BDMV directory.

A PlayList file that describes PlayLists is stored in the PLAYLIST directory. A name which combines a five-digit number and an extension ".mpls" is set to each PlayList file. File names "00000.mpls," "00001.mpls," and "00002.mpls" are set to three PlayList files illustrated in FIG. 3.

A Clip Information file is stored in the CLIPINF directory. A name which combines a five-digit number and an extension ".clpi" is set to each Clip Information file. File names "01000.clpi," "02000.clpi," and "03000.clpi" are set to three Clip Information files illustrated in FIG. 3.

An AV stream file is stored in the STREAM directory. A name which combines a five-digit number and an extension ".m2ts" is set to each AV stream file. File names "01000.m2ts," "02000.m2ts," and "03000.m2ts" are set to three AV stream files illustrated in FIG. 3.

A Clip Information file and an AV stream file to which file names having the same five-digit number are set form one Clip. The Clip Information file of "01000.clpi" is used when reproducing the AV stream file of "01000.m2ts," and the Clip Information file of "02000.clpi" is used when reproducing the AV stream file of "02000.m2ts".

A BDJO directory is also provided under the BDMV directory. A BD-J object file is stored in the BDJO directory. The BD-J object file is the file of a BD-J Object. The BD-J object file is read and executed by the reproduction apparatus 1.

<2-3. Plane Synthesis Model>

Figure 4:
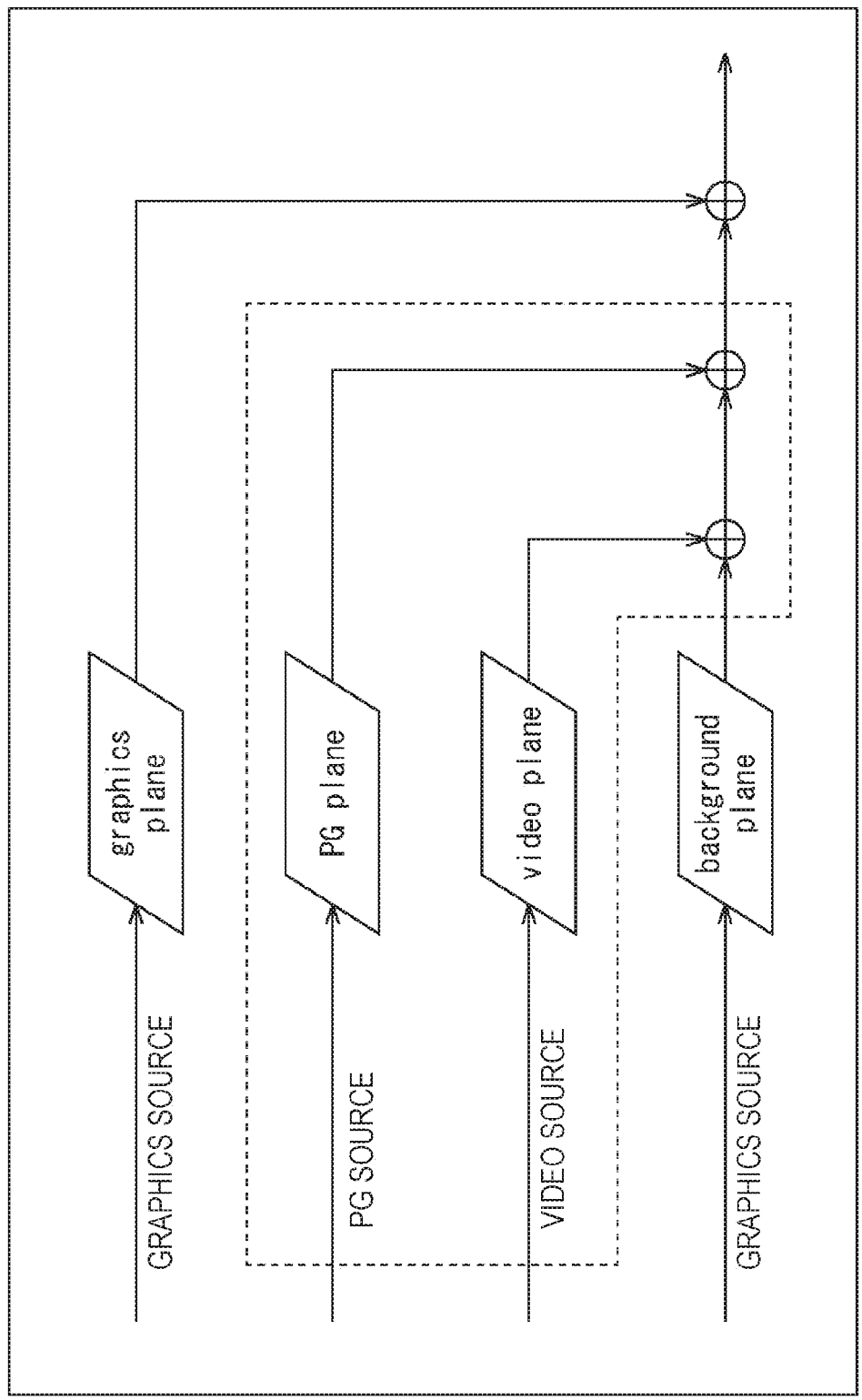
FIG. 4 is a diagram illustrating a plane synthesis model.

FIG. 4 is a diagram illustrating a plane synthesis model.

The reproduction apparatus 1 which is a BD player synthesizes data drawn (stored) on each plane according to a model illustrated in FIG. 4. A plane is a storage area formed in the memory of the reproduction apparatus 1. Items of data drawn on each plane are synthesized in a superimposed manner whereby a screen of one frame is formed. Image data before synthesis that forms the screen of one frame is stored in each plane.

As illustrated in FIG. 4, the plane includes a background plane, a video plane, a PG plane, and a graphics plane.

The background plane is a plane on which the data of graphics that forms the background of a screen is drawn. The background graphics drawn on the background plane is generated on the basis of a graphics source obtained when a BD-J application is executed.

The video plane is a plane on which the data of a video (image) is drawn. The video drawn on the video plane is generated on the basis of a video source obtained when a video stream multiplexed into AV streams is decoded.

The PG plane is a plane on which the data of subtitles of contents is drawn. The subtitles drawn on the PG plane are generated on the basis of a PG source obtained when PG streams are decoded.

The graphics plane is a plane on which the data of BD-J graphics such as buttons that form a menu screen is drawn. The BD-J graphics drawn on the graphics plane is generated on the basis of a graphics source obtained when the BD-J application is executed.

The BD-J application can draw the BD-J graphics on the graphics plane. Moreover, the BD-J application can draw the graphics serving as the background of a screen on the background plane.

The BD-J application can also control the scaling and the position of the video drawn on the video plane and the subtitles drawn on the PG plane, surrounded by a broken line, as a set.

As illustrated in FIG. 4, a video is synthesized on the background graphics and the subtitles are synthesized on the video. The BD-J graphics is synthesized on the top layer. The BD-J graphics is synthesized (alpha synthesized) after a predetermined transparency is set thereto. In the following description, the description of the PG plane will be appropriately omitted.

<2-4. Configuration of Plane>

In the BD format to which the present technology is applied, attributes representing the configuration of each plane are extended.

FIG. 5 is a diagram illustrating an example of attributes representing the configuration of each plane.

As illustrated in FIG. 5, the configuration of the graphics plane is represented by four attributes of a resolution, a color gamut, a color depth, and a dynamic range.

For example, in a case where a resolution attribute is 3840×2160 pixels, a color gamut attribute is BT.2020, a color depth attribute is 10 bits, and a dynamic range attribute is SMPTE ST.2084 specification, a BD-J graphics corresponding to these attributes is drawn on the graphics plane. In other words, the reproduction apparatus 1 needs to generate a BD-J graphics having these attributes on the basis of a graphics source. The graphics source of the BD-J graphics is fixed data in which the resolution is 1920×1080 pixels, the color gamut is sRGB, and the color depth is 8 bits for each color of RGB.

Note that, the attribute of the dynamic range represents the specification of the EOTF used for generating data to be drawn on a plane. In a case where the attribute of the dynamic range of the configuration of the graphics plane is the SMPTE ST.2084 specification, a BD-J graphics of which the dynamic range is converted using the EOTF of the SMPTE ST.2084 specification is drawn on the graphics plane.

The configuration of the video plane and the configuration of the background plane are similarly represented by the four attributes of a resolution, a color gamut, a color depth, and a dynamic range.

Note that, the graphics source of the background is fixed data in which the resolution is 1920×1080 pixels, the color gamut is sRGB, and the color depth is 8 bits for each color of RGB similarly to the graphics source of the BD-J graphics.

In this way, the reproduction apparatus 1 can represent the configuration of the graphics plane using the four attributes of a resolution, a color gamut, a color depth, and a dynamic range. In the BD-ROM format part 3 version 2.4, it is defined that the resolution is full HD (1920×1080), the color depth is 8 bits for each color of RGB and is 24 bits in total, and an alpha channel is additionally usable. However, this definition is extended.

Resolution

Figure 6:
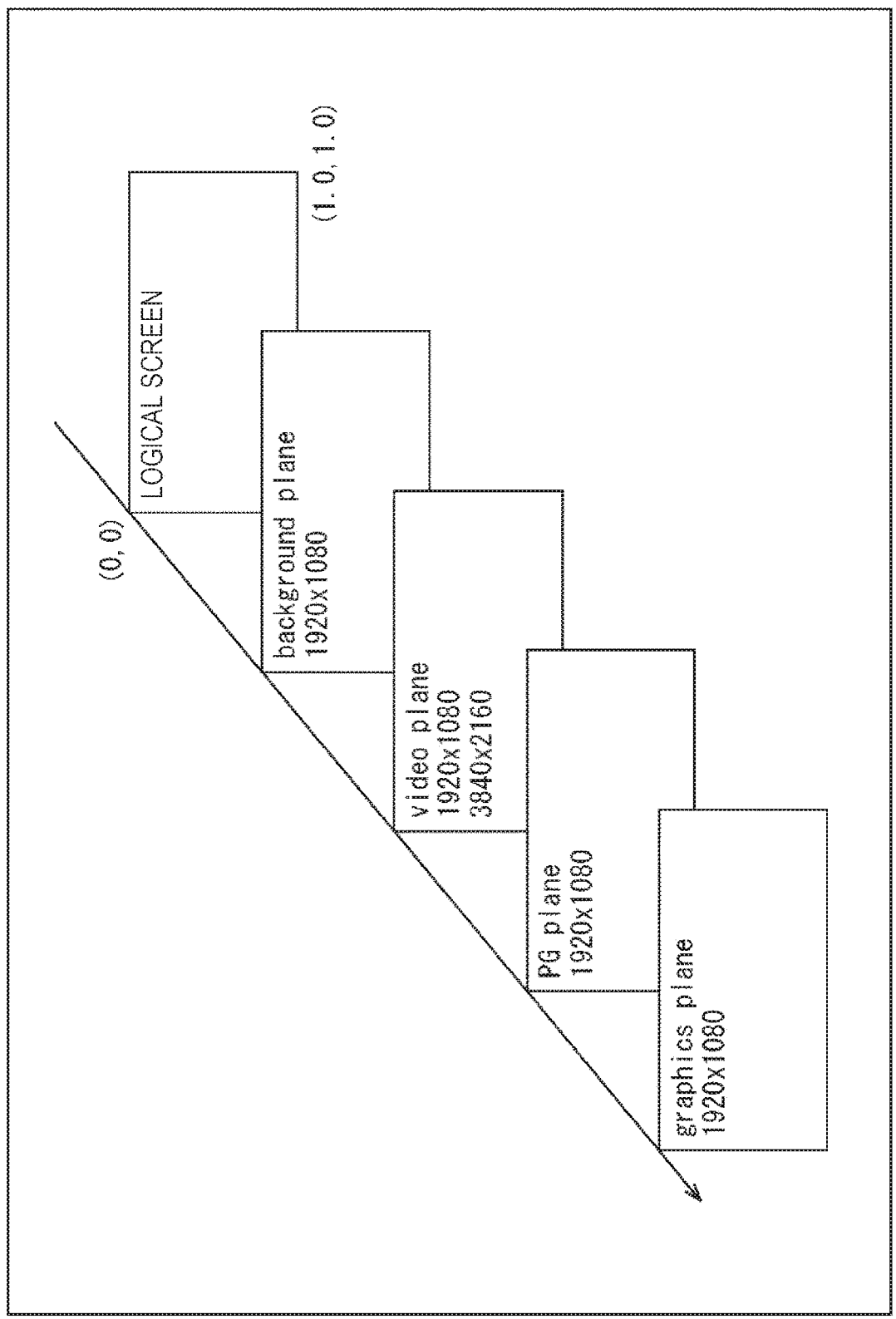
FIG. 6 is a diagram illustrating a resolution of data drawn on each plane.

FIG. 6 is a diagram illustrating the resolution of data drawn on each plane.

On a logical screen, as illustrated in FIG. 6, a background drawn on the background plane, a video drawn on the video plane, a subtitle drawn on the PG plane, and a BD-J graphics drawn on the graphics plane are synthesized in that order.

The logical screen is a logical planar area used for synthesis of data drawn on each plane. A storage area of the logical screen used for synthesizing data of each plane is secured in the memory of the reproduction apparatus 1.

Two resolutions of 1920×1080 pixels and 3840×2160 pixels are defined as the resolution of the logical screen.

Here, each position on the logical screen having the resolution of 1920×1080 pixels and each position on the logical screen having the resolution of 3840×2160 pixels are represented by a normalized value within the range of (0.0, 0.0) to (1.0, 1.0). A top-left end and a bottom-right end of the logical screen are represented by (0.0, 0.0) and (1.0, 1.0), respectively.

For example, the position (x, y)=(384, 216) on the video plane having the resolution of 3840×2160 pixels is represented by (x, y)=(0.1, 0.1) on the logical screen.

x=384/3840=0.1 y=216/2160=0.1

Similarly, the position (x, y)=(192, 108) on a predetermined plane having the resolution of 1920×1080 pixels is also represented by (x, y)=(0.1, 0.1) on the logical screen.

The BD-J application can designate the position on a plane having the resolution of 3840×2160 pixels and the position on a plane having the resolution of 1920×1080 pixels by a common index.

FIG. 7 is a diagram illustrating a combination of attributes of the resolutions of the video plane, the graphics plane, and the background plane.

As illustrated in FIG. 7, in a case where the resolution of the video plane is 1920×1080 pixels, 1920×1080 pixels is permitted as the resolutions of the graphics plane and the background plane.

In a case where the resolution of the video plane is 3840×2160 pixels, 3840×2160 pixels which up-scales the vertical and horizontal sizes of 1920×1080 pixels two times is permitted as the resolutions of the graphics plane and the background plane. In FIG. 7, "X1" represents that this resolution needs to be up-scaled to 3840×2160 pixels.

Therefore, a background having the resolution of 1920×1080 pixels input as the graphics source or a background of which the resolution of 1920×1080 pixels is up-scaled to 3840×2160 pixels is drawn on the background plane.

A video having the resolution of 1920×1080 pixels input as the video source or a video having the resolution of 3840×2160 pixels is drawn on the video plane.

A BD-J graphics having the resolution of 1920×1080 pixels input as the graphics source or a BD-J graphics of which the resolution of 1920×1080 pixels is up-scaled to 3840×2160 pixels is drawn on the graphics plane.

The resolution of the data drawn on each plane is the same resolution as the resolution of the logical screen. The reproduction apparatus 1 sets either the resolution of 1920×1080 pixels or the resolution of 3840×2160 pixels as the resolution of the logical screen before synthesis of each item of data.

The resolution of the logical screen may be set to comply with the performance of the monitor so that the resolution of 1920×1080 pixels is set in a case where the resolution of the monitor provided in the display apparatus 2 is 1920×1080 pixels, and the resolution of 3840×2160 pixels is set in a case where the resolution of the monitor is 3840×2160 pixels.

Since the resolution of 3840×2160 pixels can be set as the resolution of the logical screen, the reproduction apparatus 1 can synthesize graphics and the like with a 4K-resolution video.

Color Gamut, Color Depth, and Dynamic Range

FIGS. 8 and 9 are diagrams illustrating an example of combinations permitted as an attribute of the configuration of each plane of the video plane, the graphics plane, and the background plane.

Source data is converted to data corresponding to a permitted attribute and is drawn on each plane.

A combination #1 in FIG. 8 is a combination of a case where the resolution attribute of the video plane is 1920×1080 pixels, the color gamut attribute is BT.709, the color depth attribute is 8 bits, and the dynamic range attribute is BT.1886. In this case, it is permitted that the resolution attribute is set to 1920×1080 pixels, the color gamut attribute is set to BT.709, the color depth attribute is set to 8 bits, and the dynamic range attribute is set to BT.1886 as the attributes of the graphics plane and the background plane.

A combination #2 is a combination of a case where the resolution attribute of the video plane is 1920×1080 pixels, the color gamut attribute is BT.709, the color depth attribute is 10 bits, and the dynamic range attribute is BT.1886. In this case, it is permitted that the resolution attribute is set to 1920×1080 pixels, the color gamut attribute is set to BT.709, the color depth attribute is set to 10 bits, and the dynamic range attribute is set to BT.1886 as the attributes of the graphics plane and the background plane.

A combination #3 is a combination of a case where the resolution attribute of the video plane is 1920×1080 pixels, the color gamut attribute is BT.2020, the color depth attribute is 10 bits, and the dynamic range attribute is BT.1886. In this case, it is permitted that the resolution attribute is set to 1920×1080 pixels, the color gamut attribute is set to BT.2020, the color depth attribute is set to 10 bits, and the dynamic range attribute is set to BT.1886 as the attributes of the graphics plane and the background plane.

A combination #4 is a combination of a case where the resolution attribute of the video plane is 3840×2160 pixels, the color gamut attribute is BT.709, the color depth attribute is 10 bits, and the dynamic range attribute is BT.1886. In this case, it is permitted that the resolution attribute is set to 3840×2160 pixels obtained by up-scaling the resolution, the color gamut attribute is set to BT.709, the color depth attribute is set to 10 bits, and the dynamic range attribute is set to BT.1886 as the attributes of the graphics plane and the background plane.

A combination #5 is a combination of a case where the resolution attribute of the video plane is 3840×2160 pixels, the color gamut attribute is BT.2020, the color depth attribute is 10 bits, and the dynamic range attribute is BT.1886. In this case, it is permitted that the resolution attribute is set to 3840×2160 pixels obtained by up-scaling the resolution, the color gamut attribute is set to BT.2020, the color depth attribute is set to 10 bits, and the dynamic range attribute is set to BT.1886 as the attributes of the graphics plane and the background plane.

A combination #6 is a combination of a case where the resolution attribute of the video plane is 1920×1080 pixels, the color gamut attribute is BT.2020, the color depth attribute is 10 bits, and the dynamic range attribute is SMPTE ST.2084. In this case, it is permitted that the resolution attribute is set to 1920×1080 pixels, the color gamut attribute is set to BT.2020, the color depth attribute is set to 10 bits, and the dynamic range attribute is set to BT.1886 as the attributes of the graphics plane and the background plane. The combination #6 is a combination permitted in a case where a BD player does not have a dynamic range extension function (a function of converting a SDR image to a HDR image). In FIGS. 8 and 9, "✗2" represents this limitation.

A combination #7 is a combination of a case where the resolution attribute of the video plane is 3840×2160 pixels, the color gamut attribute is BT.2020, the color depth attribute is 10 bits, and the dynamic range attribute is SMPTE ST.2084. In this case, it is permitted that the resolution attribute is set to 3840×2160 pixels obtained by up-scaling the resolution, the color gamut attribute is set to BT.2020, the color depth attribute is set to 10 bits, and the dynamic range attribute is set to BT.1886 as the attributes of the graphics plane and the background plane. The combination #7 is a combination permitted in a case where a BD player does not have a dynamic range extension function.

A combination #8 is a combination of a case where the resolution attribute of the video plane is 1920×1080 pixels, the color gamut attribute is BT.2020, the color depth attribute is 10 bits, and the dynamic range attribute is SMPTE ST.2084. In this case, it is permitted that the resolution attribute is set to 1920×1080 pixels, the color gamut attribute is set to BT.2020, the color depth attribute is set to 10 bits, and the dynamic range attribute is set to SMPTE ST.2084 as the attributes of the graphics plane and the background plane. The combination #8 is a combination permitted in a case where a BD player has a dynamic range extension function. In FIGS. 8 and 9, "✗3" represents this limitation.

A combination #9 in FIG. 9 is a combination of a case where the resolution attribute of the video plane is 3840×2160 pixels, the color gamut attribute is BT.2020, the color depth attribute is 10 bits, and the dynamic range attribute is SMPTE ST.2084. In this case, it is permitted that the resolution attribute is set to 3840×2160 pixels obtained by up-scaling the resolution, the color gamut attribute is set to BT.2020, the color depth attribute is set to 10 bits, and the dynamic range attribute is set to SMPTE ST.2084 as the attributes of the graphics plane and the background plane. The combination #9 is a combination permitted in a case where a BD player has a dynamic range extension function.

A combination #10 is a combination of a case where the resolution attribute of the video plane is 1920×1080 pixels, the color gamut attribute is BT.2020, the color depth attribute is 10 bits, and the dynamic range attribute is PRIVATE 1. In this case, it is permitted that the resolution attribute is set to 1920×1080 pixels, the color gamut attribute is set to BT.2020, the color depth attribute is set to 10 bits, and the dynamic range attribute is set to PRIVATE 1 as the attributes of the graphics plane and the background plane. The combination #10 is a combination permitted in a case where a BD player has a dynamic range extension function.

PRIVATE 1 represents a conversion function of non-standardized EOTF which is uniquely created by a manufacturer or the like of a BD player. PRIVATE 1 is a conversion function created assuming that a video is displayed on a monitor having a higher luminance and a wider dynamic range than the standard monitor similarly to SMPTE ST.2084. PRIVATE 2 to be described later is similar.

A combination #11 is a combination of a case where the resolution attribute of the video plane is 1920×1080 pixels, the color gamut attribute is BT.2020, the color depth attribute is 10 bits, and the dynamic range attribute is PRIVATE 1. In this case, it is permitted that the resolution attribute is set to 1920×1080 pixels, the color gamut attribute is set to BT.2020, the color depth attribute is set to 10 bits, and the dynamic range attribute is set to BT.1886 as the attributes of the graphics plane and the background plane. The combination #11 is a combination permitted in a case where a BD player does not have a dynamic range extension function.

A combination #12 is a combination of a case where the resolution attribute of the video plane is 3840×2160 pixels, the color gamut attribute is BT.2020, the color depth attribute is 10 bits, and the dynamic range attribute is PRIVATE 1. In this case, it is permitted that the resolution attribute is set to 3840×2160 pixels obtained by up-scaling the resolution, the color gamut attribute is set to BT.2020, the color depth attribute is set to 10 bits, and the dynamic range attribute is set to PRIVATE 1 as the attributes of the graphics plane and the background plane. The combination #12 is a combination permitted in a case where a BD player has a dynamic range extension function.

A combination #13 is a combination of a case where the resolution attribute of the video plane is 3840×2160 pixels, the color gamut attribute is BT.2020, the color depth attribute is 10 bits, and the dynamic range attribute is PRIVATE 1. In this case, it is permitted that the resolution attribute is set to 3840×2160 pixels obtained by up-scaling the resolution, the color gamut attribute is set to BT.2020, the color depth attribute is set to 10 bits, and the dynamic range attribute is set to BT.1886 as the attributes of the graphics plane and the background plane. The combination #13 is a combination permitted in a case where a BD player does not have a dynamic range extension function.

A combination #14 is a combination of a case where the resolution attribute of the video plane is 1920×1080 pixels, the color gamut attribute is BT.2020, the color depth attribute is 12 bits, and the dynamic range attribute is PRIVATE 2. PRIVATE 2 represents a conversion function of non-standardized EOTF different from PRIVATE 1. In this case, it is permitted that the resolution attribute is set to 1920×1080 pixels, the color gamut attribute is set to BT.2020, the color depth attribute is set to 12 bits, and the dynamic range attribute is set to PRIVATE 2 as the attributes of the graphics plane and the background plane. The combination #14 is a combination permitted in a case where a BD player has a dynamic range extension function.

A combination #15 is a combination of a case where the resolution attribute of the video plane is 1920×1080 pixels, the color gamut attribute is BT.2020, the color depth attribute is 12 bits, and the dynamic range attribute is PRIVATE 2. In this case, it is permitted that the resolution attribute is set to 1920×1080 pixels, the color gamut attribute is set to BT.2020, the color depth attribute is set to 12 bits, and the dynamic range attribute is set to BT.1886 as the attributes of the graphics plane and the background plane. The combination #15 is a combination permitted in a case where a BD player does not have a dynamic range extension function.

A combination #16 is a combination of a case where the resolution attribute of the video plane is 3840×2160 pixels, the color gamut attribute is BT.2020, the color depth attribute is 12 bits, and the dynamic range attribute is PRIVATE 2. In this case, it is permitted that the resolution attribute is set to 3840×2160 pixels obtained by up-scaling the resolution, the color gamut attribute is set to BT.2020, the color depth attribute is set to 12 bits, and the dynamic range attribute is set to PRIVATE 2 as the attributes of the graphics plane and the background plane. The combination #16 is a combination permitted in a case where a BD player has a dynamic range extension function.

A combination #17 is a combination of a case where the resolution attribute of the video plane is 3840×2160 pixels, the color gamut attribute is BT.2020, the color depth attribute is 12 bits, and the dynamic range attribute is PRIVATE 2. In this case, it is permitted that the resolution attribute is set to 3840×2160 pixels obtained by up-scaling the resolution, the color gamut attribute is set to BT.2020, the color depth attribute is set to 12 bits, and the dynamic range attribute is set to BT.1886 as the attributes of the graphics plane and the background plane. The combination #17 is a combination permitted in a case where a BD player does not have a dynamic range extension function.

In this manner, four attributes are defined as the attributes that represent the configurations of the planes of the video plane, the graphics plane, and the background plane are defined, and the combinations of attributes which are permitted to be set are defined.

That is, how the resolution, the color gamut, the color depth, and the dynamic range of the graphics are converted and how data is drawn on the graphics plane and the background plane are limited.

Information representing at least a portion of the combinations illustrated in FIGS. 8 and 9 is stored in the reproduction apparatus 1. The reproduction apparatus 1 selects a combination that is to be used according to the resolution or the like of the logical screen before data is drawn on each plane. Attributes that constitute the selected combination are set to each plane.

The attributes of the graphics plane and the background plane in the combinations illustrated in FIGS. 8 and 9 are attributes with which no color blur occurs before and after the graphics source is converted according to the attributes. As described above, the graphics source of the BD-J graphics and the graphics source of the background are data of which the resolution is 1920×1080 pixels, the color gamut is sRGB, and the color depth is 8 bits for each color of RGB.

In the conventional BD format, the attributes (a resolution, a color gamut, a color depth) of the graphics source only are defined, but how the graphics source is converted and data is drawn on a plane is not defined.

Therefore, focusing on the color gamut, for example, in a case where the color gamut of the video source is BT.709 and the color gamut of a video drawn on the video plane is BT.709, it depends on implementation whether the graphics source is synthesized with a video after the color gamut thereof is converted to BT.709 or the video source is synthesized with a graphics after the color gamut thereof is converted to sRGB. Since BT.709 and sRGB are compatible color gamuts, it does not matter if any one of the color gamuts may be converted so as to comply with the other color gamut.

However, in a case where the specification of a wide color gamut such as BT.2020 is allowed to be employed to a video source, unless a conversion destination color gamut of a source color gamut is limited, conversion from a non-expressible color and conversion to a non-expressible color may occur. This can cause the loss of a large amount of information such as a color blur unlike the loss of pixel data due to reduction of the resolution or the like.

By limiting the combinations of attributes of each plane, it is possible to prevent the occurrence of a color blur and to appropriately convert the graphics.

<2-5. Specific Example of Conversion>

Figure 10:
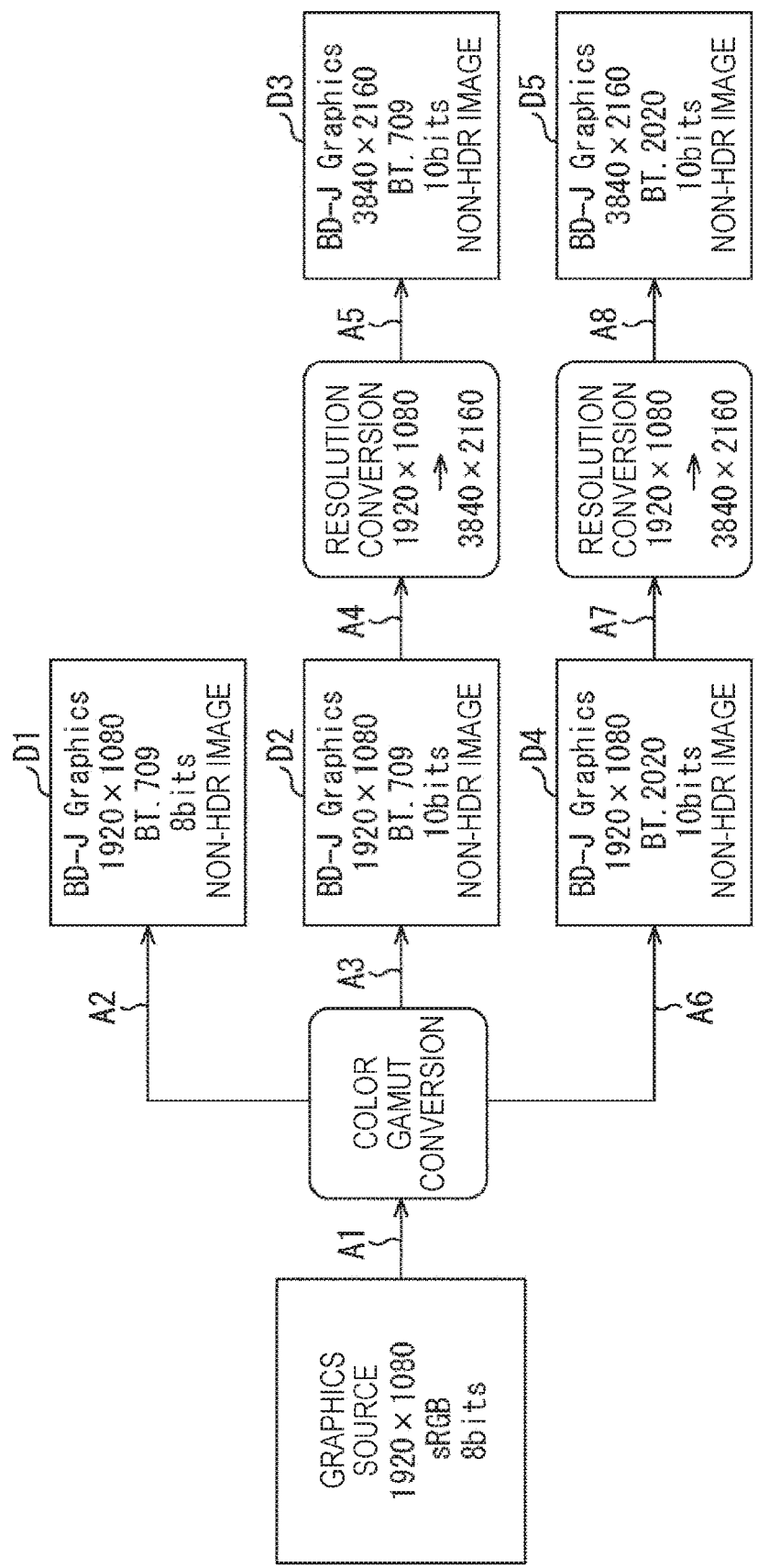
FIG. 10 is a diagram illustrating a specific example of conversion of a graphics source.

FIG. 10 is a diagram illustrating a specific example of conversion of a graphics source.

The conversion illustrated in FIG. 10 is performed in a case where the reproduction apparatus 1 does not have a dynamic range extension function. In a case where the reproduction apparatus 1 does not have a dynamic range extension function, it is allowed to select any one of the combinations #1 to #5, #6, #7, #11, #13, #15, and #17 illustrated in FIGS. 8 and 9.

Figure 11:
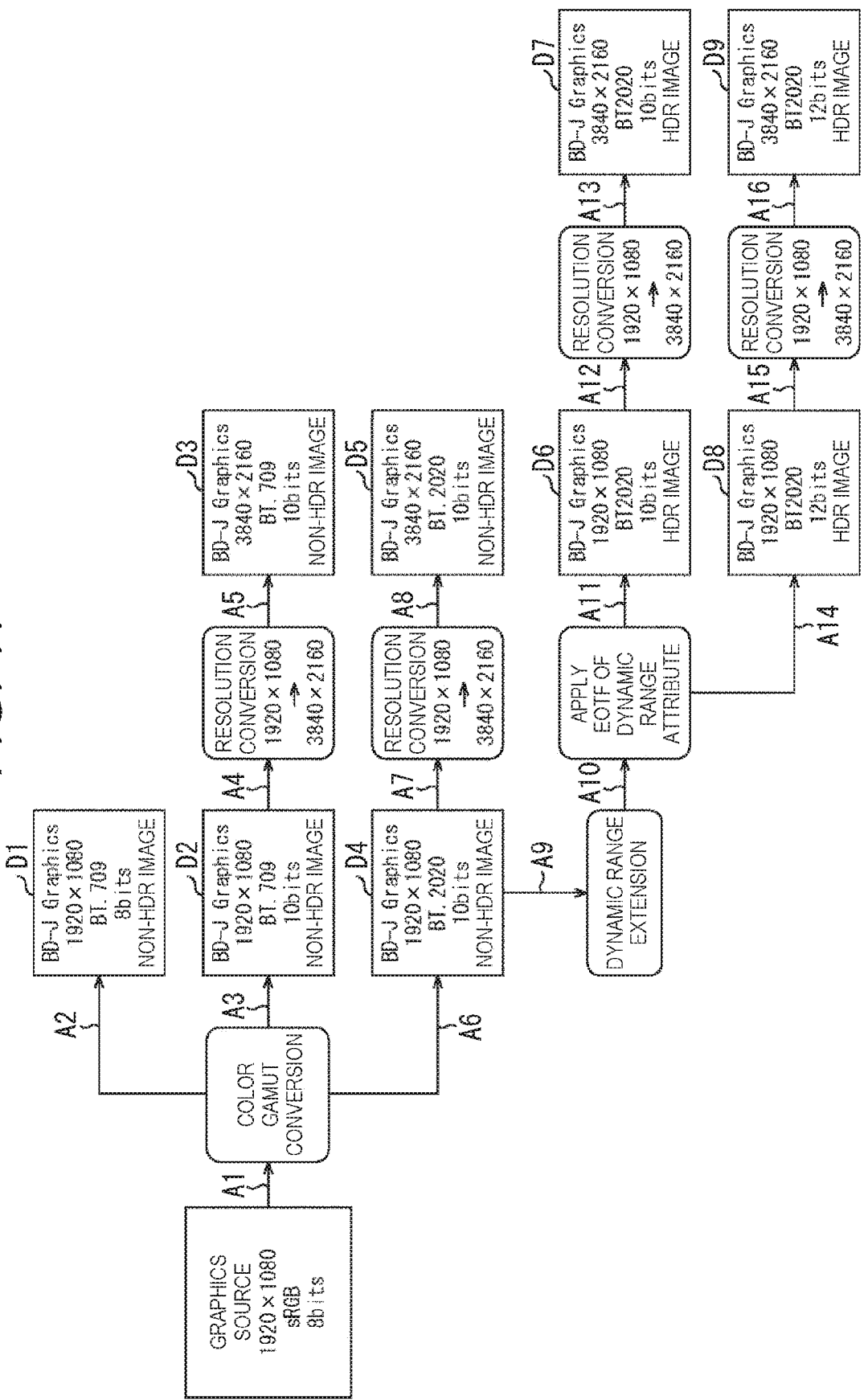
FIG. 11 is a diagram illustrating another specific example of conversion of a graphics source.

Conversion of the graphics source of the BD-J graphics will be described. However, the graphics source of the background drawn on the background plane is converted in a similar manner. FIG. 11 to be described later is similar.

In a case where a graphics source of which the resolution is 1920×1080 pixels, the color gamut is sRGB, and the color depth is 8 bits for each color of RGB is input, the reproduction apparatus 1 performs color gamut conversion as indicated by the distal end of arrow A1.

In a case where the combination #1 is selected, the reproduction apparatus 1 converts the color gamut of the graphics source to BT.709 and draws data D1 after conversion on the graphics plane as indicated by the distal end of arrow A2.

Data D1 is a BD-J graphics which is permitted to be drawn on a graphics plane as the combination #1 and of which the resolution is 1920×1080 pixels, the color gamut is BT.709, and the color depth is 8 bits. The BD-J graphics of the data D1 is a SDR image.

In a case where the combination #2 is selected, the reproduction apparatus 1 converts the color gamut of the graphics source to BT.709, converts the color depth to 10 bits, and draws data D2 after conversion on the graphics plane as indicated by the distal end of arrow A3.

Data D2 is a BD-J graphics which is permitted to be drawn on a graphics plane as the combination #2 and of which the resolution is 1920×1080 pixels, the color gamut is BT.709, and the color depth is 10 bits. The BD-J graphics of the data D2 is a SDR image.

In a case where the combination #4 is selected, the reproduction apparatus 1 generates data D2 and then up-scales the data D2 to 3840×2160 pixels as indicated by the distal end of arrow A4. The reproduction apparatus 1 draws data D3 obtained by the up-scaling on the graphics plane as indicated by the distal end of arrow A5.

Data D3 is a BD-J graphics which is permitted to be drawn on a graphics plane as the combination #4 and of which the resolution is 3840×2160 pixels, the color gamut is BT.709, and the color depth is 10 bits. The BD-J graphics of the data D3 is a SDR image.

In a case where the combination #3, #6, or #11 is selected, the reproduction apparatus 1 converts the color gamut of the graphics source to BT.2020, converts the color depth to 10 bits, and draws data D4 after conversion on the graphics plane as indicated by the distal end of arrow A6.

Data D4 is a BD-J graphics which is permitted to be drawn on a graphics plane as the combination #3, #6, or #11 and of which the resolution is 1920×1080 pixels, the color gamut is BT.2020, and the color depth is 10 bits. The BD-J graphics of the data D4 is a SDR image.

Note that, in a case where the combination #15 is selected, the reproduction apparatus 1 extends the color depth of data D4 to 12 bits to generate a BD-J graphics of which the resolution is 1920×1080 pixels, the color gamut is BT.2020, and the color depth is 12 bits.

In a case where the combination #5, #7, or #13 is selected, the reproduction apparatus 1 generates data D4 and up-scales the data D4 to 3840×2160 pixels as indicated by the distal end of arrow A7. The reproduction apparatus 1 draws data D5 obtained by the up-scaling on a graphics plane as indicated by the distal end of arrow A8.

Data D5 is a BD-J graphics which is permitted to be drawn on a graphics plane as the combination #5, #7, or #13 and of which the resolution is 3840×2160 pixels, the color gamut is BT.2020, and the color depth is 10 bits. The BD-J graphics of the data D5 is a SDR image.

Note that, in a case where the combination #17 is selected, the reproduction apparatus 1 extends the color depth of data D5 to 12 bits to generate a BD-J graphics of which the resolution is 3840×2160 pixels, the color gamut is BT.2020, and the color depth is 12 bits.

The BD-J graphics of the items of data D1 to D5 generated in this manner and drawn on the graphics plane are synthesized on a logical screen with a video which is a SDR image drawn on the video plane whereby an output image is generated.

FIG. 11 is a diagram illustrating another specific example of conversion of a graphics source.

The conversion illustrated in FIG. 11 is performed in a case where the reproduction apparatus 1 has a dynamic range extension function. In a case where the reproduction apparatus 1 has a dynamic range extension function, it is allowed to select any one of the combinations #1 to #5, #8 to #10, #12, #14, and #16 illustrated in FIGS. 8 and 9.

The process of a case where the combinations #1 to #5 are selected is similar to the process described with reference to FIG. 10. In a case where the reproduction apparatus 1 has a dynamic range extension function, the reproduction apparatus 1 can convert a SDR image to a HDR image and output the HDR image. Outputting BD-J graphics of the items of data D1 to D5 which are SDR images by synthesizing the same on a video is performed, for example, in a case where a user has set such that a HDR image is not to be output.

The BD-J graphics of the items of data D1 to D5 drawn on the graphics plane is synthesized on a logical screen with a video drawn on the video plane. The image on the logical screen after synthesis is subjected to dynamic range extension appropriately, and an output image is generated.

In a case where a user has set such that a HDR image is to be output and the any one of the combinations #8 to #10, #12, #14, and #16 is selected, the dynamic range is extended as indicated by the distal end of arrow A9. The dynamic range extension is performed by applying a certain EOTF of the dynamic range attribute that constitutes the selected combination to the data D4 which is a SDR image as indicated by the distal end of arrow A10.

In a case where the combination #8 or #10 is selected, the reproduction apparatus 1 draws the data D6 obtained by extending the dynamic range on the graphics plane as indicated by the distal end of arrow A11 by applying a certain EOTF of the dynamic range attribute.

Data D6 is a BD-J graphics which is permitted to be drawn on a graphics plane as the combination #8 or #10 and of which the resolution is 1920×1080 pixels, the color gamut is BT.2020, and the color depth is 10 bits. The BD-J graphics of the data D6 generated during selection of the combination #8 is a HDR image generated by applying the EOTF of SMPTE ST.2084. On the other hand, the BD-J graphics of the data D6 generated during selection of the combination #10 is a HDR image generated by applying the EOTF of PRIVATE 1.

In a case where the combination #9 or #12 is selected, the reproduction apparatus 1 generates data D6 and then up-scales the data D6 to 3840×2160 pixels as indicated by the distal end of arrow A13. The reproduction apparatus 1 draws data D7 obtained by the up-scaling on the graphics plane as indicated by the distal end of arrow A14.

Data D7 is a BD-J graphics which is permitted to be drawn on a graphics plane as the combination #9 or #12 and of which the resolution is 3840×2160 pixels, the color gamut is BT.2020, and the color depth is 10 bits. The BD-J graphics of the data D7 generated during selection of the combination #9 is a HDR image generated by applying the EOTF of SMPTE ST.2084. On the other hand, the BD-J graphics of the data D7 generated during selection of the combination #12 is a HDR image generated by applying the EOTF of PRIVATE 1.

In a case where the combination #14 is selected, the reproduction apparatus 1 draws the data D8 obtained by extending the dynamic range on the graphics plane as indicated by the distal end of arrow A14 by applying a certain EOTF of the dynamic range attribute.

Data D8 is a BD-J graphics which is permitted to be drawn on a graphics plane as the combination #14 and of which the resolution is 1920×1080 pixels, the color gamut is BT.2020, and the color depth is 12 bits. The BD-J graphics of the data D8 is a HDR image generated by applying the EOTF of PRIVATE 2.

In a case where the combination #16 is selected, the reproduction apparatus 1 generates data D8 and then up-scales the data D8 to 3840×2160 pixels as indicated by the distal end of arrow A15. The reproduction apparatus 1 draws data D9 obtained by the up-scaling on the graphics plane as indicated by the distal end of arrow A16.

Data D9 is a BD-J graphics which is permitted to be drawn on a graphics plane as the combination #16 and of which the resolution is 3840×2160 pixels, the color gamut is BT.2020, and the color depth is 12 bits. The BD-J graphics of the data D9 is a HDR image generated by applying the EOTF of PRIVATE 2.

The BD-J graphics of the items of data D6 to D9 generated in this manner and drawn on the graphics plane are synthesized on a logical screen with a video which is a HDR image drawn on the video plane whereby an output image is generated.

<<3. Configuration of Reproduction Apparatus 1>>

Figure 12:
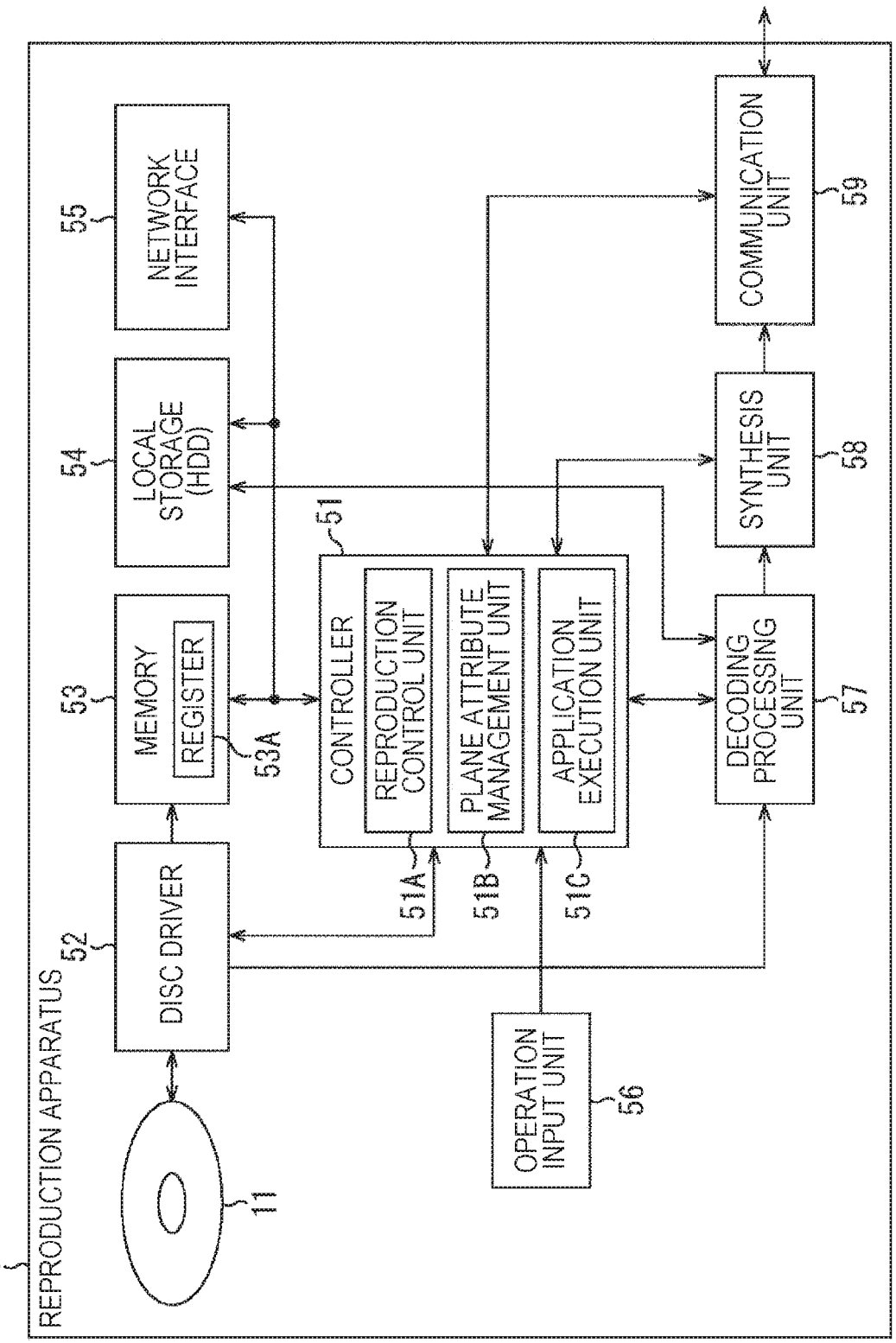
FIG. 12 is a block diagram illustrating a configuration example of a reproduction apparatus 1.

FIG. 12 is a block diagram illustrating a configuration example of the reproduction apparatus 1.

The reproduction apparatus 1 includes a controller 51, a disc driver 52, a memory 53, a local storage 54, a network interface 55, an operation input unit 56, a decoding processing unit 57, a synthesis unit 58, and a communication unit 59.

The controller 51 includes a CPU, a ROM, a RAM, and the like. The controller 51 executes a predetermined program and controls an overall operation of the reproduction apparatus 1.

When a predetermined program is executed by the controller 51, a reproduction control unit 51A, a plane attribute management unit 51B, and an application execution unit 51C are realized.

The reproduction control unit 51A acquires and analyzes Data Base information such as an Index table, a PlayList, Clip Information, and the like. The reproduction control unit 51A controls the decoding processing unit 57 to reproduce contents.

The plane attribute management unit 51B stores and manages information representing combinations of attributes representing the configuration of each plane, illustrated in FIGS. 8 and 9. Moreover, the plane attribute management unit 51B selects one combination. The plane attribute management unit 51B sets attributes representing the configuration of each plane by outputting plane attribute information which is information representing the selected combination to the synthesis unit 58. The plane attribute management unit 51B also sets the attribute of a logical screen, such as a resolution.

The application execution unit 51C acquires a BD-J object file read from the disc 11 and executes a BD-J application. The application execution unit 51C generates a graphics source of a BD-J graphics used for displaying a menu screen and a graphics source of the background by executing the BD-J application. The application execution unit 51C outputs the generated graphics sources to the synthesis unit 58.

The disc driver 52 reads and acquires data from the disc 11 and outputs the acquired data to the controller 51, the memory 53, or the decoding processing unit 57. For example, the disc driver 52 outputs the Data Base information and the BD-J application files to the controller 51 and outputs AV streams to the decoding processing unit 57.

The memory 53 stores data and the like necessary for the controller 51 to execute various processes. A register 53A which is a PSR (player status register) is formed in the memory 53. Various items of information representing the functions of the reproduction apparatus 1 which is a BD player and the current setting of the reproduction apparatus 1 are stored in the register 53A. The information stored in the register 53A is referred to when reproducing the disc 11.

The local storage 54 is configured as a hard disk drive (HDD), for example. Streams and the like downloaded from a server are recorded on the local storage 54.

The network interface 55 performs communication with a server via a network such as the Internet and supplies data downloaded from the server to the local storage 54.

The operation input unit 56 is configured as an input device such as a button, a key, and a touch panel and a receiver that receives signals such as infrared rays transmitted from a predetermined remote commander. The operation input unit 56 detects a user's operation and supplies a signal representing the content of the detected operation to the controller 51.

The decoding processing unit 57 decodes video streams multiplexed into AV streams supplied from the disc driver 52 and outputs the decoded data to the synthesis unit 58 as a video source.

The synthesis unit 58 synthesizes a video with a graphics on the basis of a video source supplied from the decoding processing unit 57 and a graphics source supplied from the application execution unit 51C to generate an output image. The synthesis unit 58 outputs the data of the generated output image to the communication unit 59.

The communication unit 59 performs communication with the display apparatus 2 via a cable 3. For example, the communication unit 59 acquires information on a display performance of the monitor included in the display apparatus 2 and outputs the acquired information to the controller 51. The information on the display performance of the monitor included in the display apparatus 2 is stored in and managed by a PSR, for example. Moreover, the communication unit 59 outputs the data of the output image supplied from the synthesis unit 58 to the display apparatus 2.

Figure 13:
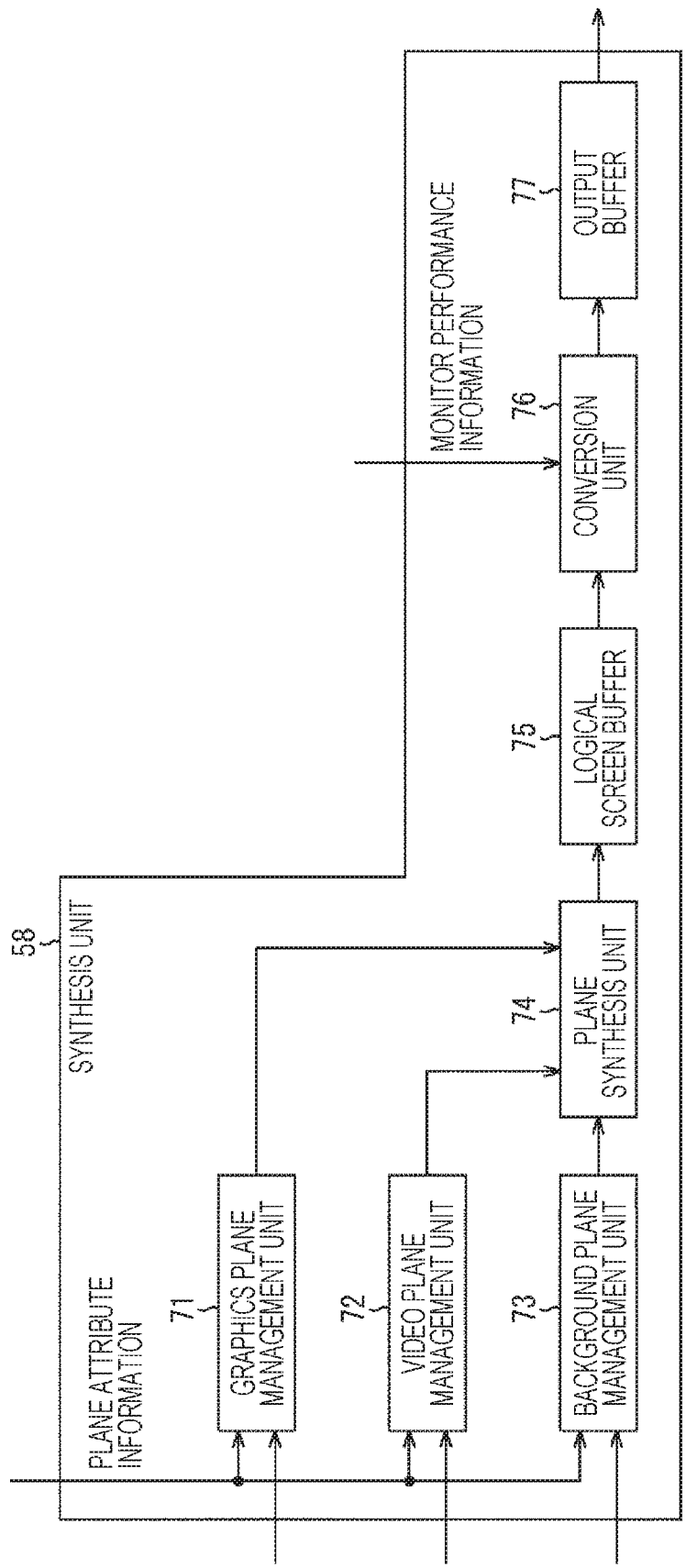
FIG. 13 is a block diagram illustrating a configuration example of a synthesis unit 58 in FIG. 12.

FIG. 13 is a block diagram illustrating a configuration example of the synthesis unit 58 illustrated in FIG. 12.

The synthesis unit 58 includes a graphics plane management unit 71, a video plane management unit 72, a background plane management unit 73, a plane synthesis unit 74, a logical screen buffer 75, a conversion unit 76, and an output buffer 77. The plane attribute information supplied from the plane attribute management unit 51B is supplied to the graphics plane management unit 71, the video plane management unit 72, and the background plane management unit 73.

The graphics plane management unit 71 has a memory that constitutes the graphics plane and manages the graphics plane. The graphics plane management unit 71 performs a conversion process on the graphics source supplied from the application execution unit 51C and generates a BD-J graphics corresponding to the graphics plane attribute represented by the plane attribute information. The graphics plane management unit 71 draws the data of the generated BD-J graphics on the graphics plane.

The video plane management unit 72 has a memory that constitutes the video plane and manages the video plane. The video plane management unit 72 performs a conversion process as necessary on the video source supplied from the decoding processing unit 57 and generates a video corresponding to the video plane attribute represented by the plane attribute information. The graphics plane management unit 71 draws the data of the generated video on the video plane.

The background plane management unit 73 has a memory that constitutes the background plane and manages the background plane. The background plane management unit 73 performs a conversion process on the graphics source supplied from the application execution unit 51C and generates a background corresponding to the background plane attribute represented by the plane attribute information. The graphics plane management unit 71 draws the data of the generated background on the background plane.

The plane synthesis unit 74 manages the logical screen buffer 75 that constitutes the logical screen. The plane synthesis unit 74 synthesizes, on the logical screen, the video drawn on the video plane managed by the video plane management unit 72, with the background drawn on the background plane managed by the background plane management unit 73. Moreover, the plane synthesis unit 74 synthesizes, on the logical screen, the BD-J graphics drawn on the graphics plane managed by the graphics plane management unit 71, with the video synthesized with the background. Image data of the logical screen in which the background, the video, and the BD-J graphics are synthesized is stored in the logical screen buffer 75.

The conversion unit 76 reads the output image stored in the logical screen buffer 75 and converts the read output image to an image corresponding to the performance of the monitor included in the display apparatus 2 appropriately. Monitor performance information representing the performance of the monitor, stored in the PSR is supplied to the conversion unit 76. The resolution, the color gamut, the maximum luminance, and the like, of the monitor, displayable by the display apparatus 2 are represented by the monitor performance information.

The conversion unit 76 stores the output image converted according to the performance of the monitor in the output buffer 77. The output image stored in the output buffer 77 is output to the display apparatus 2 via the communication unit 59.

Figure 14:
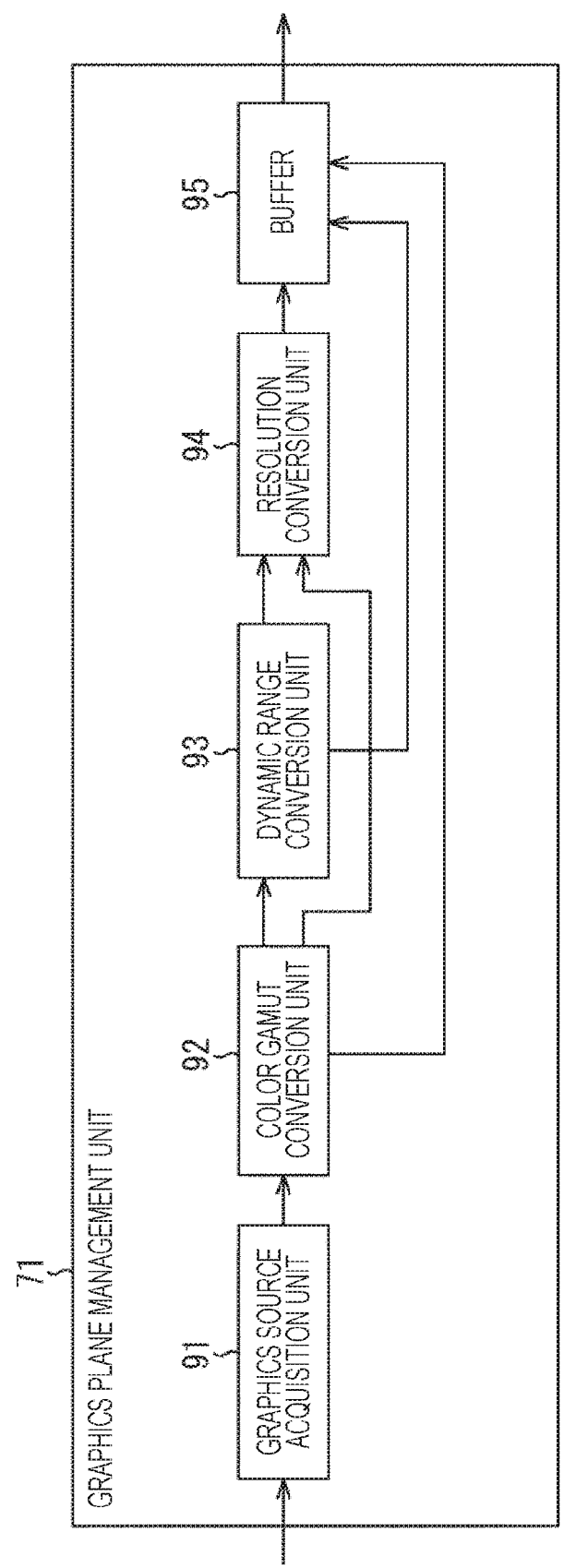
FIG. 14 is a block diagram illustrating a configuration example of a graphics plane management unit 71 in FIG. 13.

FIG. 14 is a block diagram illustrating a configuration example of the graphics plane management unit 71 illustrated in FIG. 13.

The graphics plane management unit 71 includes a graphics source acquisition unit 91, a color gamut conversion unit 92, a dynamic range conversion unit 93, a resolution conversion unit 94, and a buffer 95.

The graphics source acquisition unit 91 acquires the graphics source supplied from the application execution unit 51C and supplies the graphics source to the color gamut conversion unit 92.

The color gamut conversion unit 92 converts the color gamut of the graphics source according to the color gamut attribute of the graphics plane represented by the plane attribute information as described with reference to FIGS. 10 and 11. The color gamut conversion unit 92 converts a graphics source having the color gamut of sRGB to data of BT.709 or BT.2020 and outputs the data of the BD-J graphics obtained by the conversion to the dynamic range conversion unit 93, the resolution conversion unit 94, or the buffer 95.

The data of the BD-J graphics of which the color gamut is converted by the color gamut conversion unit 92 is supplied to the dynamic range conversion unit 93 in a case where dynamic range conversion is performed and is supplied to the resolution conversion unit 94 in a case where dynamic range conversion is not performed but resolution conversion is performed. Moreover, the data of the BD-J graphics of which the color gamut is converted is supplied to the buffer 95 in a case where dynamic range conversion and resolution conversion are not performed.

The dynamic range conversion unit 93 converts the dynamic range of the BD-J graphics according to the dynamic range attribute of the graphics plane represented by the plane attribute information as described with reference to FIG. 11. The dynamic range conversion unit 93 generates a BD-J graphics of a HDR image by applying the EOTF of SMPTE ST.2084 to the BD-J graphics of which the color gamut is converted and outputs the data of the BD-J graphics to the resolution conversion unit 94 or the buffer 95.

The data of the BD-J graphics of which the dynamic range is converted by the dynamic range conversion unit 93 is supplied to the resolution conversion unit 94 in a case where resolution conversion is performed. Moreover, the data of the BD-J graphics of which the dynamic range is converted is supplied to the buffer 95 in a case where resolution conversion is not performed.

The resolution conversion unit 94 converts the resolution of the BD-J graphics according to the resolution attribute of the graphics plane represented by the plane attribute information as described with reference to FIGS. 10 and 11. The resolution conversion unit 94 up-scales the BD-J graphics which has the resolution of 1920×1080 pixels and of which the color gamut is converted or the BD-J graphics which has the resolution of 1920×1080 pixels and of which the dynamic range is converted to 3840×2160 pixels. The resolution conversion unit 94 outputs the data of the BD-J graphics which has the resolution of 3840×2160 pixels and of which the resolution is converted to the buffer 95.

The buffer 95 has a storage area that forms the graphics plane. The data of the BD-J graphics supplied from the color gamut conversion unit 92, the dynamic range conversion unit 93, or the resolution conversion unit 94 is stored in the buffer 95. The data of the BD-J graphics stored in the buffer 95 is read by the plane synthesis unit 74.

The reproduction apparatus 1 having the graphics plane management unit 71 illustrated in FIG. 14, including the dynamic range conversion unit 93 is a BD player having a dynamic range extension function. The dynamic range conversion unit 93 is not provided in the graphics plane management unit 71 of a BD player which does not have the dynamic range extension function. Note that, the same configuration as the configuration illustrated in FIG. 14 is also provided in the background plane management unit 73.

<<4. Operation of Reproduction Apparatus 1>>

Here, the operation of the reproduction apparatus 1 having the above-described configuration will be described.

First, a content reproduction process of the reproduction apparatus 1 will be described with reference to the flowchart of FIG. 15.

Figure 15:
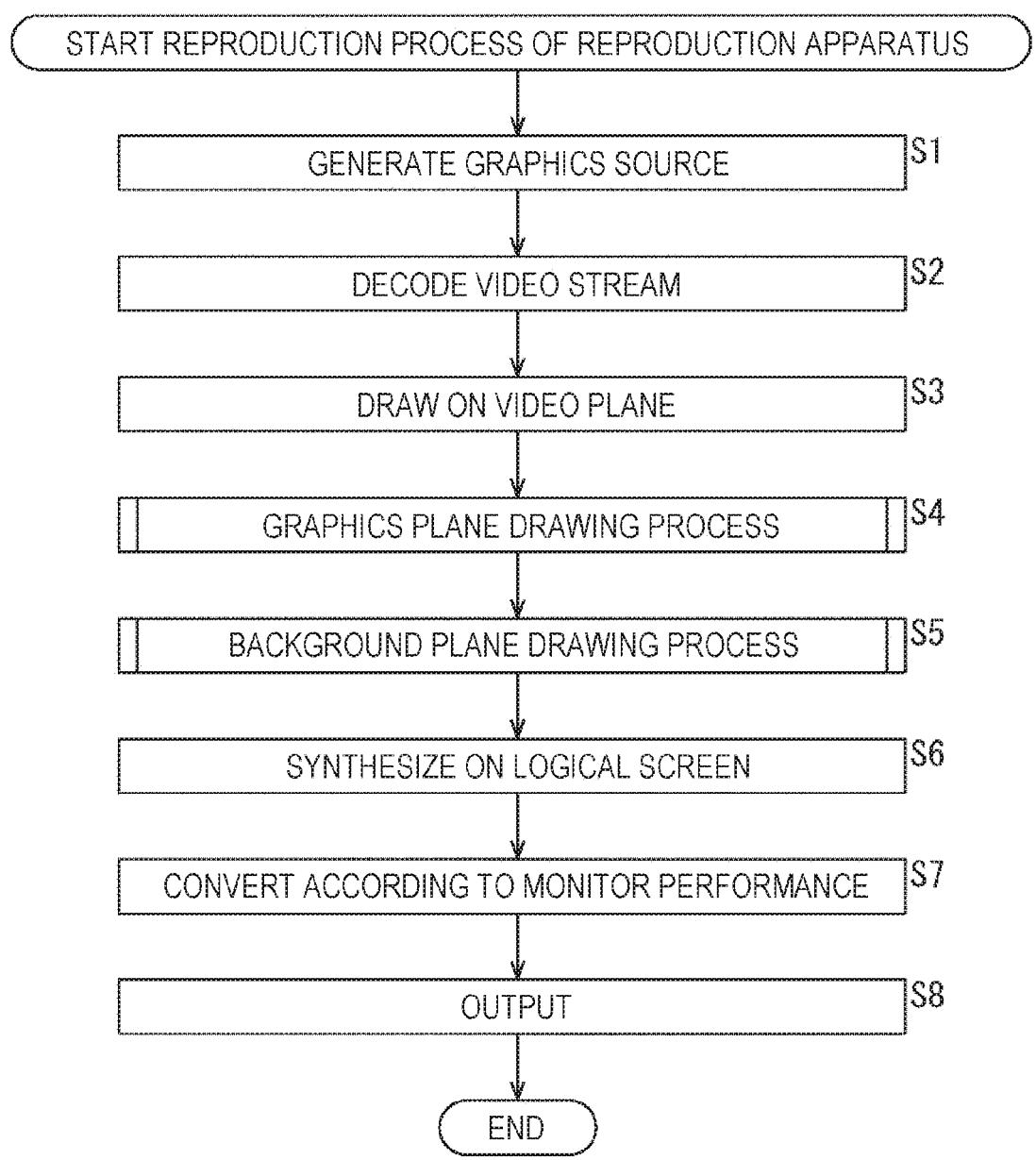
FIG. 15 is a flowchart for describing a content reproduction process of the reproduction apparatus 1.

The process illustrated in FIG. 15 starts when it is instructed to display a menu screen configured by a BD-J graphics during reproduction of the disc 11, for example. The resolution of the logical screen is set in advance by the plane attribute management unit 51B, for example. Moreover, the combination of attributes representing the configuration of each plane is selected from seventeen combinations in advance by the plane attribute management unit 51B. Information representing the performance of the monitor included in the display apparatus 2 is acquired in advance by the communication unit 59 and is managed by the PSR.

In step S1, the application execution unit 51C generates a graphics source of a BD-J graphics by executing a BD-J application.

In step S2, the decoding processing unit 57 decodes video streams multiplexed into AV streams supplied from the disc driver 52 and outputs a video source to the synthesis unit 58.

In step S3, the video plane management unit 72 of the synthesis unit 58 generates a video corresponding to the attribute of the video plane represented by the plane attribute information and draws the video on the video plane.

In step S4, the graphics plane management unit 71 performs a graphics plane drawing process. By the graphics plane drawing process, the data of the BD-J graphics is drawn on the graphics plane. The graphics plane drawing process will be described later with reference to the flowchart of FIG. 16.

In step S5, the background plane management unit 73 performs a background plane drawing process. By the background plane drawing process, the background data is drawn on the background plane.

In step S6, the plane synthesis unit 74 synthesizes, on the logical screen, the video drawn on the video plane with the background drawn on the background plane. Moreover, the plane synthesis unit 74 synthesizes, on the logical screen, the BD-J graphics drawn on the graphics plane with the video synthesized with the background.

In step S7, the conversion unit 76 reads image data of the logical screen from the logical screen buffer 75 and converts the read data to data corresponding to the performance of the monitor represented by the monitor performance information. The conversion unit 76 outputs the data of the output image after the conversion to the communication unit 59.

In step S8, the communication unit 59 outputs the data of the output image supplied from the synthesis unit 58 to the display apparatus 2. The above-described processes are repeatedly performed when the BD-J graphics is displayed.

Next, the graphics plane drawing process performed in step S4 of FIG. 15 will be described with reference to the flowchart of FIG. 16.

Figure 16:
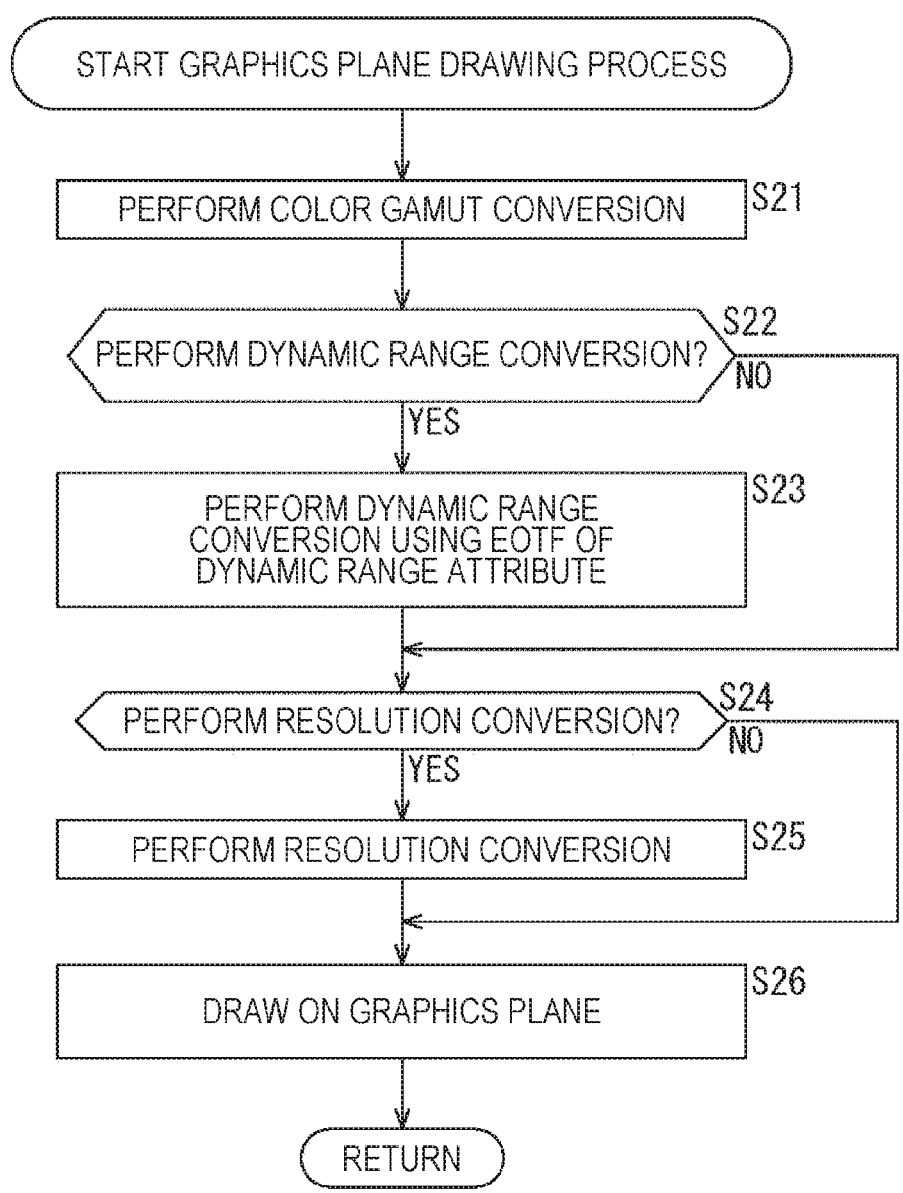
FIG. 16 is a flowchart for describing a graphics plane drawing process performed in step S4 of FIG. 15.

The process illustrated in FIG. 16 starts when the graphics source of the BD-J graphics is acquired by the graphics source acquisition unit 91 and is output to the color gamut conversion unit 92, for example.

In step S21, the color gamut conversion unit 92 converts the color gamut of the graphics source according to the color gamut attribute of the graphics plane represented by the plane attribute information.

In step S22, the dynamic range conversion unit 93 determines whether dynamic range conversion is to be performed or not.

In a case where it is determined in step S22 that dynamic range conversion is to be performed, the flow proceeds to step S23. In step S23, the dynamic range conversion unit 93 converts the dynamic range of the BD-J graphics after the color gamut conversion according to the dynamic range attribute of the graphics plane represented by the plane attribute information.

In a case where it is determined in step S22 that dynamic range conversion is not to be performed, the flow proceeds to step S23.

In step S24, the resolution conversion unit 94 determines whether resolution conversion is to be performed or not.

In a case where it is determined in step S24 that resolution conversion is to be performed, the flow proceeds to step S25. In step S25, the resolution conversion unit 94 converts the resolution of the BD-J graphics after the color gamut conversion or the BD-J graphics after the dynamic range conversion according to the resolution attribute of the graphics plane represented by the plane attribute information.

In a case where it is determined in step S24 that resolution conversion is not to be performed, the flow proceeds to step S25.

In step S26, the buffer 95 stores the data of the BD-J graphics generated by the color gamut conversion unit 92, the dynamic range conversion unit 93, or the resolution conversion unit 94 (draws the data on the graphics plane). After that, the flow returns to step S4 of FIG. 15 and the subsequent processes are performed.

Processes similar to the above-described processes are performed in step S5 of FIG. 15, and the background data is drawn on the background plane.

By the above-described series of processes, the reproduction apparatus 1 can prevent the occurrence of a color blur and convert the graphics appropriately.

Figure 17:
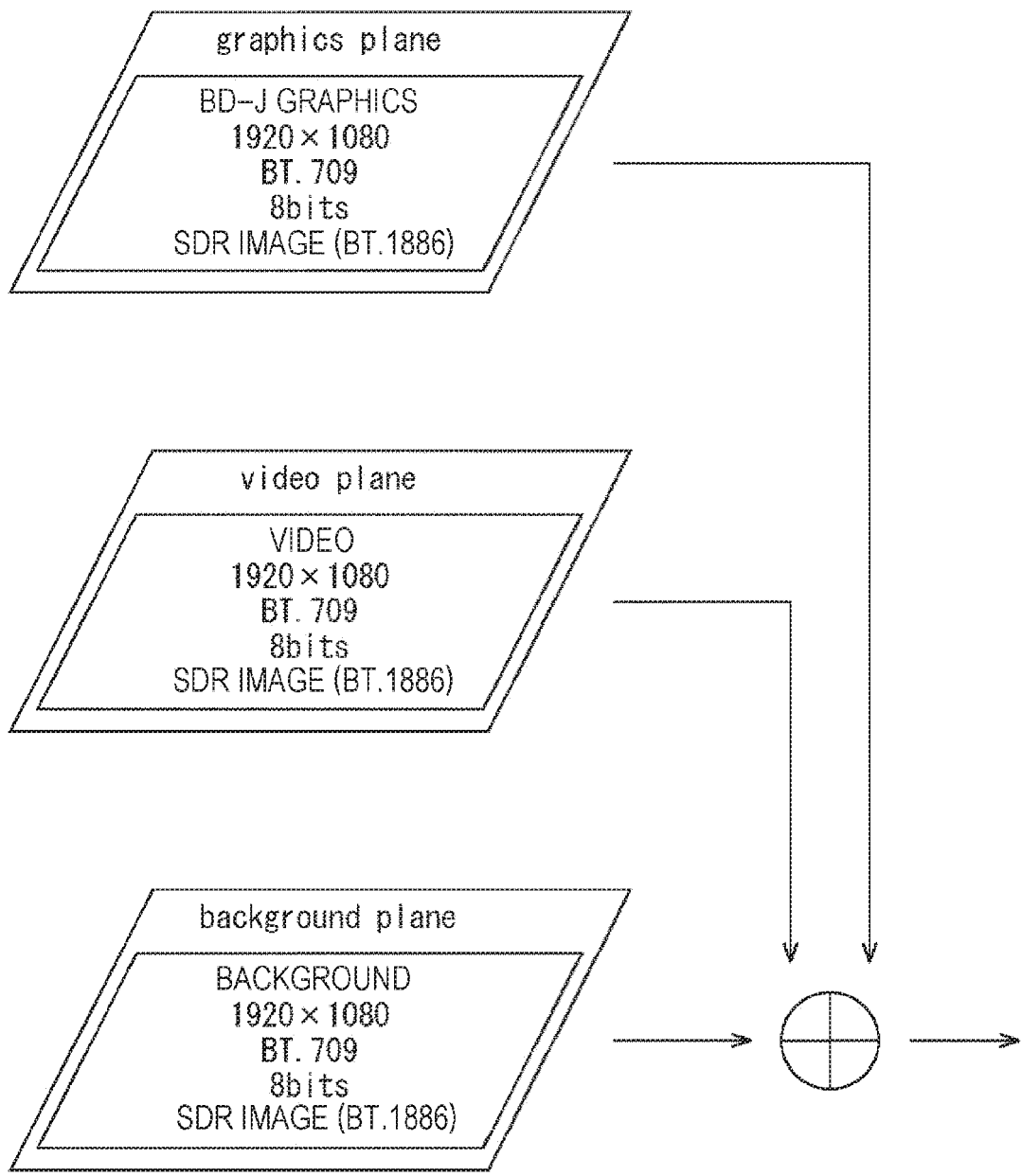
FIG. 17 is a diagram illustrating a specific example of plane synthesis.

FIG. 17 is a diagram illustrating a specific example of plane synthesis.

FIG. 17 illustrates an example of a case where the combination #1 is selected as the combination of the attributes representing the configuration of each plane. The resolution of the logical screen is set to 1920×1080 pixels.

In this case, the data of a background of which the resolution is 1920×1080 pixels, the configuration is BT.709, and the color depth is 8 bits and which is generated using the EOTF of BT.1886 is drawn on the background plane. Moreover, the data of a video of which the resolution is 1920×1080 pixels, the color gamut is BT.709, and the color depth is 8 bits and which is generated using the EOTF of BT.1886 is drawn on the video plane.

The data of a BD-J graphics of which the resolution is 1920×1080 pixels, the color gamut is BT.709, and the color depth is 8 bits and which is generated as the data D1 in FIG. 11, for example, using the EOTF of BT.1886 is drawn on the graphics plane.

These items of data drawn on the respective planes are synthesized on the logical screen.

Figure 18:
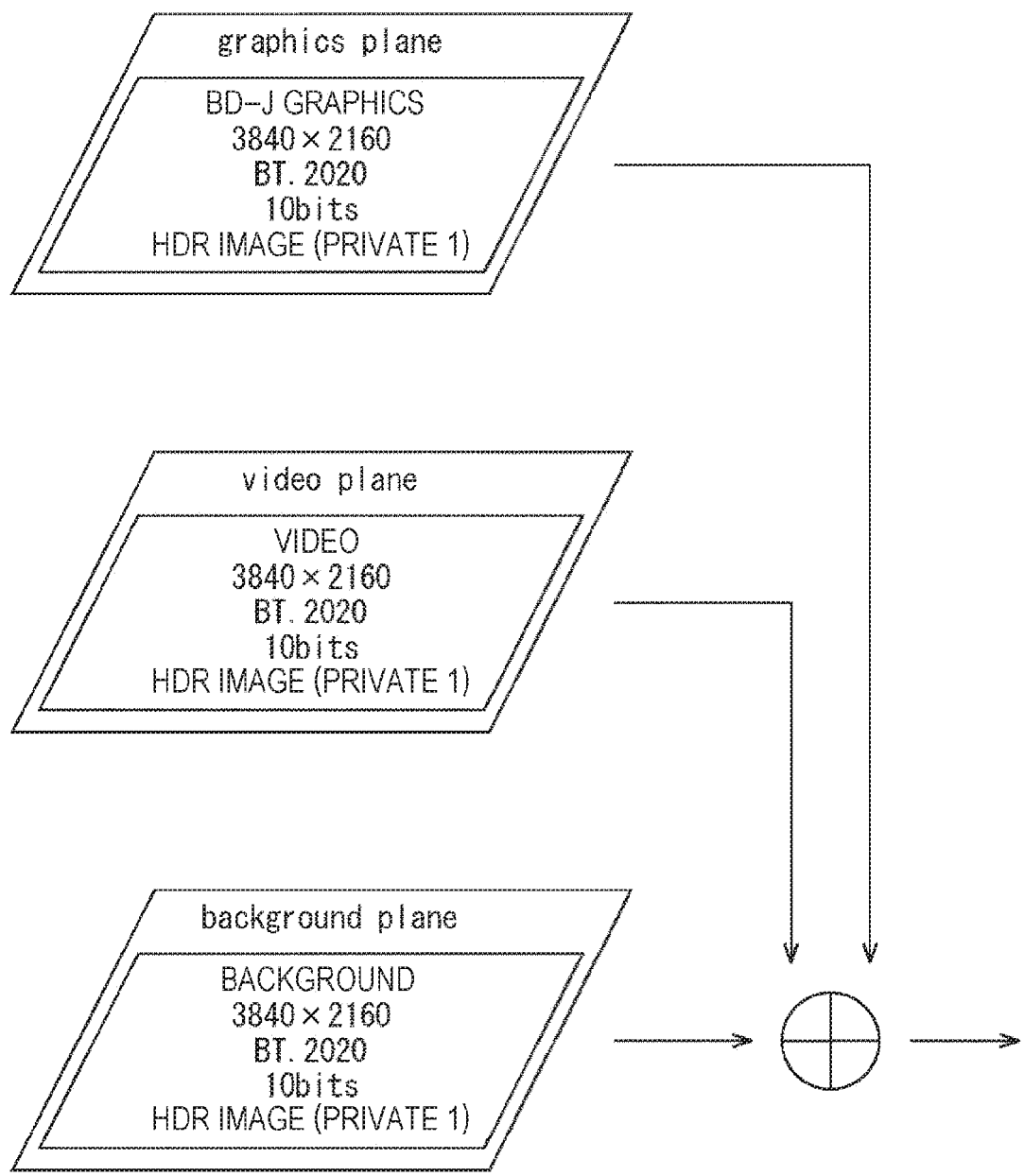
FIG. 18 is a diagram illustrating another specific example of plane synthesis.

FIG. 18 is a diagram illustrating another specific example of the plane synthesis.

FIG. 18 illustrates an example of a case where the combination #12 is selected as the combination of attributes representing the configuration of each plane. The resolution of the logical screen is set to 3840×2160 pixels.

In this case, the data of a background of which the resolution is 3840×2160 pixels, the configuration is BT.2020, and the color depth is 10 bits and which is generated using the EOTF of PRIVATE 1 is drawn on the background plane. Moreover, the data of a video of which the resolution is 3840×2160 pixels, the color gamut is BT.2020, and the color depth is 10 bits and which is generated using the EOTF of PRIVATE 1 and is formed of HDR images is drawn on the video plane.

The data of a BD-J graphics of which the resolution is 3840×2160 pixels, the color gamut is BT.2020, and the color depth is 10 bits and which is generated as the data D7 in FIG. 11, for example, using the EOTF of PRIVATE 1 is drawn on the graphics plane.

These items of data drawn on the respective planes are synthesized on the logical screen.

<<5. Modification>>

In the above-described embodiment, although the resolution of the graphics source generated by the BD-J application is 1920×1080 pixels, the graphics source having the resolution of 3840×2160 pixels may be generated.

Moreover, in the example of FIGS. 8 and 9, although the EOTFs of PRIVATE 1 and PRIVATE 2 only are illustrated as examples of non-standard EOTFs, the EOTF may be uniquely extended to PRIVATE 3, PRIVATE 4, . . . , and so on, for example.

The user may be allowed to select one combination of attributes representing the configuration of each plane among seventeen combinations illustrated in FIGS. 8 and 9. Moreover, a plurality of combinations may be selected and managed according to a priority.

<5-1. Configuration Example of Computer>

The above-described series of processes can be executed not only by hardware but also by software. In a case where the series of processes is executed by the software, a program constituting the software is installed from a program recording medium in a computer integrated into exclusive hardware or a general-personal computer.

Figure 19:
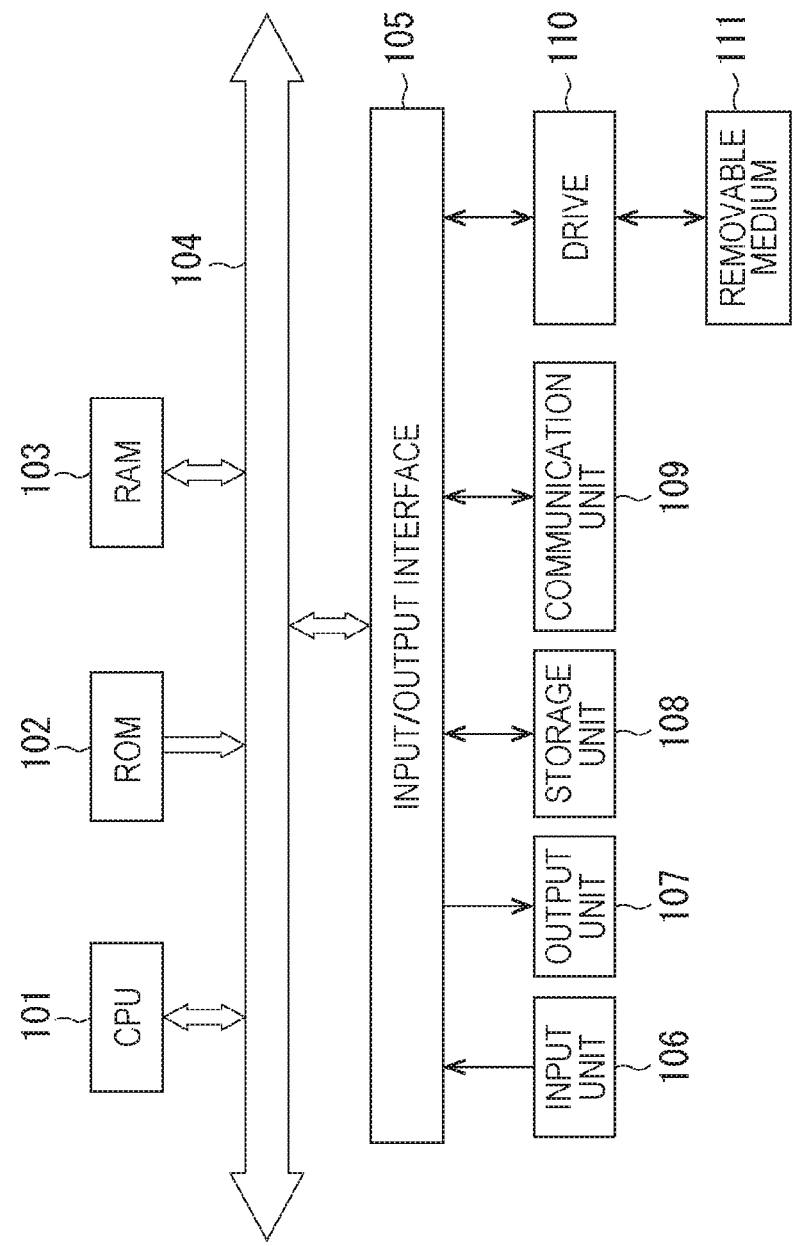
FIG. 19 is a block diagram illustrating a configuration example of a computer.

FIG. 19 is a block diagram illustrating a configuration example of hardware of a computer that executes the above-described series of processes by a program.

A central processing unit (CPU) 101, a read only memory (ROM) 102, and a random access memory (RAM) 103 are connected to each other by a bus 104.

An input/output interface 105 is connected to the bus 104. An input unit 106 configured as a keyboard, a mouse, and the like and an output unit 107 configured as a display, a speaker, and the like are connected to the input/output interface 105. Moreover, a storage unit 108 configured as a hard disk or a nonvolatile memory, a communication unit 109 configured as a network interface, and a drive 110 that drives a removable medium 111 are connected to the input/output interface 105.

In the computer configured in this manner, the CPU 101 loads the program stored in the storage unit 108 into the RAM 103 via the input/output interface 105 and the bus 104 and executes the program to thereby perform the above-described series of processes, for example.

The program executed by the CPU 101 is recorded, for example, on the removable medium 111 or is provided via a cable or wireless transmission medium such as a local area network, the Internet, or digital broadcasting, and is installed in the storage unit 108.

Note that, the program executed by the computer may be a program executing processing in a time-sequential manner in accordance with the procedures described in this specification and may be a program executing the processing in a parallel manner or at necessary times such as in response to calls.

The effects described in the present specification are examples only and are not limited thereto, and other effects may be provided.

The embodiments of the present technology are not limited to the above-described embodiments, but various modifications can be made in a range not departing from the gist of the present technology.

For example, the present technology may take the configuration of cloud computing in which one function is shared and processed by a plurality of apparatuses via a network.

Moreover, the respective steps described in the above-described flowcharts may be executed by a plurality of apparatuses as well as being executed by one apparatus.

Furthermore, in a case where one step includes a plurality of processes, the plurality of processes included in one step may be executed by a plurality of apparatuses as well as being executed by one apparatus.

<5-2. Combination Example of Configuration>

The present technology may have the following configuration.

(1)

A reproduction apparatus including:

a setting unit that sets a predetermined combination from a plurality of combinations of attributes representing a configuration of a video plane which is a storage area of data before a video that constitutes an output image is synthesized and attributes representing a configuration of a graphics plane which is a storage area of data before a graphics that constitutes the output image is synthesized, each of the configuration of the video plane and the configuration of the graphics plane being represented by attributes of a resolution, a color gamut, a color depth, and a dynamic range conversion function;

a decoding unit that decodes a video stream;

a first generation unit that generates data of a video corresponding to an attribute representing the configuration of the video plane that constitutes the predetermined combination set by the setting unit on the basis of data obtained by decoding the video stream and stores the generated data in the video plane;

an execution unit that executes an application that controls display of the graphics;

a second generation unit that generates data of a graphics corresponding to an attribute representing the configuration of the graphics plane that constitutes the predetermined combination set by the setting unit on the basis of source data obtained by execution of the application and stores the generated data in the graphics plane;

a synthesis unit that synthesizes the data of the video stored in the video plane and the data of the graphics stored in the graphics plane; and an output unit that outputs data of the output image obtained by the synthesis of the synthesis unit.

(2)

The reproduction apparatus according to (1), in which the second generation unit converts a color gamut of the source data, performs at least one of processes of resolution conversion and dynamic range conversion using the dynamic range conversion function on the data obtained by converting the color gamut to generate data, and stores the generated data in the graphics plane.

(3)

The reproduction apparatus according to (1) or (2), in which the setting unit further sets an attribute of a synthesis storage area to be used for synthesis of the video data stored in the video plane and the graphics data stored in the graphics plane.

(4)

The reproduction apparatus according to (3), in which the setting unit sets a predetermined resolution as an attribute of the synthesis storage area and sets a combination in which the same resolution as the predetermined resolution is included in an attribute as the predetermined combination.

(5)

The reproduction apparatus according to any of (1) to (4), further including:

a storage unit that stores performance information representing a performance of a monitor that outputs the output image; and a conversion unit that converts the output image obtained by the synthesis of the synthesis unit to an image which can be output by the performance represented by the performance information, in which the output unit outputs data of the output image after conversion of the conversion unit.

(6)

The reproduction apparatus according to any of (1) to (5), further including:

a reading unit that reads the video stream and the data of the application from a recording medium mounted on the reproduction apparatus.

(7)

The reproduction apparatus according to any of (1) to (6), in which the recording medium is a Blu-ray Disc, and the application is a BD-J application.

(8)

An information processing method including:

setting a predetermined combination from a plurality of combinations of attributes representing a configuration of a video plane which is a storage area of data before a video that constitutes an output image is synthesized and attributes representing a configuration of a graphics plane which is a storage area of data before a graphics that constitutes the output image is synthesized, each of the configuration of the video plane and the configuration of the graphics plane being represented by attributes of a resolution, a color gamut, a color depth, and a dynamic range conversion function;

decoding a video stream;

generating data of a video corresponding to an attribute representing the configuration of the video plane that constitutes the set predetermined combination on the basis of data obtained by decoding the video stream and storing the generated data in the video plane;

executing an application that controls display of the graphics;

generating data of a graphics corresponding to an attribute representing the configuration of the graphics plane that constitutes the set predetermined combination on the basis of source data obtained by execution of the application and storing the generated data in the graphics plane;

synthesizing the data of the video stored in the video plane and the data of the graphics stored in the graphics plane; and outputting data of the output image obtained by the synthesis.

(9)

A program for causing a computer to execute a process including the steps of:

setting a predetermined combination from a plurality of combinations of attributes representing a configuration of a video plane which is a storage area of data before a video that constitutes an output image is synthesized and attributes representing a configuration of a graphics plane which is a storage area of data before a graphics that constitutes the output image is synthesized, each of the configuration of the video plane and the configuration of the graphics plane being represented by attributes of a resolution, a color gamut, a color depth, and a dynamic range conversion function;

decoding a video stream;

generating data of a video corresponding to an attribute representing the configuration of the video plane that constitutes the set predetermined combination on the basis of data obtained by decoding the video stream and storing the generated data in the video plane;

executing an application that controls display of the graphics;

generating data of a graphics corresponding to an attribute representing the configuration of the graphics plane that constitutes the set predetermined combination on the basis of source data obtained by execution of the application and storing the generated data in the graphics plane;

synthesizing the data of the video stored in the video plane and the data of the graphics stored in the graphics plane; and outputting data of the output image obtained by the synthesis.

REFERENCE SIGNS LIST

1 Reproduction apparatus
2 Display apparatus
11 Disc
51 Controller
51A Reproduction control unit
51B Plane attribute management unit
51C Application execution unit
57 Decoding processing unit
58 Synthesis unit
71 Graphics plane management unit
72 Video plane management unit
73 Background plane management unit
74 Plane synthesis unit
75 Logical screen buffer
76 Conversion unit
77 Output buffer

The invention claimed is:

1. A reproduction apparatus, comprising:
a central processing unit (CPU) configured to:
set a specific combination from a plurality of combinations of a plurality of attributes, wherein
the plurality of attributes represents a configuration of a video plane and a configuration of a graphics plane,
the video plane is a storage area of a video,
the graphics plane is a storage area of a plurality of graphics, and
the plurality of attributes includes a resolution, a color gamut, a color depth, and a dynamic range conversion function;

read each of a video stream and application data of an
   application from a recording medium, wherein
the recording medium is mountable on the reproduction
   apparatus,
the recording medium is a Blu-ray Disc (BD), and
the application is a BD-Java (BD-J) application;
decode the video stream;
generate first data of the video, corresponding to a first
   attribute of the specific combination, based on the
   decoded video stream;
store the first data in the video plane;
execute the application;
control display of the plurality of graphics based on the
   execution of the application;
obtain source data based on the execution of the application;
convert a color gamut of the source data;
convert a dynamic range of the source data and a resolution of the source data based on the converted color gamut of the source data;
generate second data of the plurality of graphics based on the conversion of the dynamic range of the source data and the resolution of the source data;
store the second data in the graphics plane;
synthesize the first data of the video stored in the video plane and the second data of the plurality of graphics stored in the graphics plane;
obtain an output image based on the synthesis of the first data and the second data; and
output the output image.

2. The reproduction apparatus according to claim 1, wherein the CPU is further configured to:
set a specific attribute of a synthesis storage area; and
utilize the synthesis storage area for the synthesis of the first data and the second data.

3. The reproduction apparatus according to claim 2, wherein
the CPU is further configured to set a specific resolution as the specific attribute of the synthesis storage area, and
the specific combination includes the specific resolution as a second attribute.

4. The reproduction apparatus according to claim 1, further comprising a memory configured to store performance information of a monitor that outputs the output image, wherein
the CPU is further configured to:
convert the output image, obtained by the synthesis, to a specific image based on the performance information; and
output the specific image.

5. An information processing method, comprising:
in a reproduction apparatus:
setting a specific combination from a plurality of combinations of a plurality of attributes, wherein
the plurality of attributes represents a configuration of a video plane and a configuration of a graphics plane,
the video plane is a storage area of a video,
the graphics plane is a storage area of a plurality of graphics, and
the plurality of attributes includes a resolution, a color gamut, a color depth, and a dynamic range conversion function;
reading each of a video stream and application data of an application from a recording medium, wherein
the recording medium is mountable on the reproduction apparatus,
the recording medium is a Blu-ray Disc (BD), and
the application is a BD-Java (BD-J) application;
decoding the video stream;
generating first data of the video, corresponding to an attribute of the specific combination, based on the decoded video stream;
storing the first data of the video in the video plane;
executing the application;
controlling display of the plurality of graphics based on the execution of the application;
obtaining source data based on the execution of the application;
converting a color gamut of the source data;
converting a dynamic range of the source data and a resolution of the source data based on the converted color gamut of the source data;
generating second data of the plurality of graphics based on the conversion of the dynamic range of the source data and the resolution of the source data;
storing the second data of the plurality of graphics in the graphics plane;
synthesizing the first data of the video stored in the video plane and the second data of the plurality of graphics stored in the graphics plane;
obtaining an output image based on the synthesis of the first data and the second data; and
outputting the output image.

6. A non-transitory computer-readable medium, having stored thereon computer-executable instructions, which when executed by a processor of a reproduction apparatus, cause the processor to execute operations, the operations comprising:
setting a specific combination from a plurality of combinations of a plurality of attributes, wherein
the plurality of attributes represents a configuration of a video plane and a configuration of a graphics plane, the video plane is a storage area of a video,
the graphics plane is a storage area of a plurality of graphics, and
the plurality of attributes includes a resolution, a color gamut, a color depth, and a dynamic range conversion function;
reading each of a video stream and application data of an application from a recording medium, wherein
the recording medium is mountable on the reproduction apparatus,
the recording medium is a Blu-ray Disc (BD), and
the application is a BD-Java (BD-J) application;
decoding the video stream;
generating first data of the video, corresponding to an attribute of the specific combination, based on the decoded video stream;
storing the first data of the video in the video plane;
executing the application;
controlling display of the plurality of graphics based on the execution of the application;
obtaining source data based on the execution of the application;
converting a color gamut of the source data;
converting a dynamic range of the source data and a resolution of the source data based on the converted color gamut of the source data;
generating second data of the plurality of graphics based on the conversion of the dynamic range of the source data and the resolution of the source data;
storing the second data in the graphics plane;

synthesizing the first data of the video stored in the video plane and the second data of the plurality of graphics stored in the graphics plane;
obtain an output image based on the synthesis of the first data and the second data; and
outputting the output image.

* * * * *